US007691931B2

(12) United States Patent
Li et al.

(10) Patent No.: US 7,691,931 B2
(45) Date of Patent: Apr. 6, 2010

(54) ORGANIC-INORGANIC HYBRID MATERIAL AND METHOD OF PREPARING THE ORGANIC-INORGANIC HYBRID MATERIAL, AND ELECTROPHOTOGRAPHIC PHOTORECEPTOR, PROCESS CARTRIDGE, IMAGE FORMING APPARATUS AND IMAGE FORMING METHOD USING THE ORGANIC-INORGANIC HYBRID MATERIAL

(75) Inventors: Hongguo Li, Numazu (JP); Kazukiyo Nagai, Numazu (JP)

(73) Assignee: Ricoh Company Ltd., Tokyo (JP)

( * ) Notice: Subject to any disclaimer, the term of this patent is extended or adjusted under 35 U.S.C. 154(b) by 1049 days.

(21) Appl. No.: 11/270,693

(22) Filed: Nov. 10, 2005

(65) Prior Publication Data

US 2006/0122303 A1 Jun. 8, 2006

(30) Foreign Application Priority Data

Nov. 10, 2004 (JP) ............................. 2004-326497

(51) Int. Cl.
*C08K 3/22* (2006.01)

(52) U.S. Cl. ......................... 524/430; 430/58.7; 430/66; 430/127; 430/123.4; 524/602

(58) Field of Classification Search ................ 430/58.7, 430/66; 524/430
See application file for complete search history.

(56) References Cited

U.S. PATENT DOCUMENTS

| | | | | |
|---|---|---|---|---|
| 5,168,024 | A * | 12/1992 | Yamamoto et al. | 430/58.2 |
| 5,976,746 | A | 11/1999 | Tanaka et al. | |
| 6,172,176 | B1 | 1/2001 | Tanaka et al. | |
| 6,187,492 | B1 | 2/2001 | Ri et al. | |
| 6,187,494 | B1 | 2/2001 | Kawamura et al. | |
| 6,210,848 | B1 | 4/2001 | Nagai et al. | |
| 6,303,736 | B1 | 10/2001 | Kawamura et al. | |
| 6,444,387 | B2 | 9/2002 | Ri et al. | |
| 6,486,293 | B1 | 11/2002 | Ri et al. | |
| 6,576,386 | B1 | 6/2003 | Ri et al. | |
| 6,664,361 | B2 | 12/2003 | Sasaki et al. | |
| 6,790,571 | B2 | 9/2004 | Kawamura et al. | |
| 6,849,367 | B2 | 2/2005 | Shosh et al. | |
| 6,899,983 | B2 | 5/2005 | Tamoto et al. | |
| 6,919,419 | B2 | 7/2005 | Ri et al. | |
| 6,939,651 | B2 | 9/2005 | Li et al. | |
| 2003/0073015 | A1 * | 4/2003 | Tamoto et al. | 430/66 |
| 2004/0053152 | A1 | 3/2004 | Nagai et al. | |

(Continued)

FOREIGN PATENT DOCUMENTS

| | | |
|---|---|---|
| JP | 56-048637 | 5/1981 |

(Continued)

OTHER PUBLICATIONS

English language translation of JP 2002-080576 published Mar. 2002.*

(Continued)

*Primary Examiner*—Mark F Huff
*Assistant Examiner*—Peter L Vajda
(74) *Attorney, Agent, or Firm*—Oblon, Spivak, McClelland, Maier & Neustadt, L.L.P.

(57) ABSTRACT

An organic-inorganic hybrid material, including a charge transportable organic polymer and a metal oxide.

17 Claims, 4 Drawing Sheets

U.S. PATENT DOCUMENTS

| | | | |
|---|---|---|---|
| 2004/0248024 A1 | 12/2004 | Suzuki et al. |
| 2004/0253527 A1 | 12/2004 | Suzuki et al. |
| 2005/0003287 A1 | 1/2005 | Kawamura et al. |
| 2005/0112487 A1 | 5/2005 | Shoshi et al. |
| 2005/0158641 A1 | 7/2005 | Yanagawa et al. |
| 2005/0221210 A1 | 10/2005 | Suzuki et al. |

FOREIGN PATENT DOCUMENTS

| | | |
|---|---|---|
| JP | 56-117245 | 9/1981 |
| JP | 57-176057 | 10/1982 |
| JP | 61-117558 | 6/1986 |
| JP | 61-132954 | 6/1986 |
| JP | 63-091666 | 4/1988 |
| JP | 64-001728 | 1/1989 |
| JP | 01-205171 | 8/1989 |
| JP | 02-240655 | 9/1990 |
| JP | 03-155558 | 7/1991 |
| JP | 04-281461 | 10/1992 |
| JP | 05-306335 | 11/1993 |
| JP | 06-032884 | 2/1994 |
| JP | 06-282094 | 10/1994 |
| JP | 07-261440 | 10/1995 |
| JP | 09-272735 | 10/1997 |
| JP | 11-209596 | 8/1999 |
| JP | 2000-105474 | 4/2000 |
| JP | 2002-080576 | * 3/2002 |
| JP | 2002-241483 | 8/2002 |
| JP | 2003-098710 | 4/2003 |

OTHER PUBLICATIONS

U.S. Appl. No. 10/944,003, filed Sep. 20, 2004, Yanagawa, et al.
U.S. Appl. No. 11/561,983, filed Nov. 21, 2006, Sugino, et al.

* cited by examiner

ORGANIC-INORGANIC HYBRID MATERIAL AND METHOD OF PREPARING THE ORGANIC-INORGANIC HYBRID MATERIAL, AND ELECTROPHOTOGRAPHIC PHOTORECEPTOR, PROCESS CARTRIDGE, IMAGE FORMING APPARATUS AND IMAGE FORMING METHOD USING THE ORGANIC-INORGANIC HYBRID MATERIAL

BACKGROUND OF THE INVENTION

1. Field of the Invention

The present invention relates to an organic-inorganic hybrid material for use in electron devices such as electrophotographic photoreceptors, and more particularly to an electrophotographic photoreceptor including the organic-inorganic hybrid material, a process cartridge using the photoreceptor, an image forming apparatus equipped therewith and an image forming method using the apparatus.

2. Discussion of the Background

Recently, among plastic complex materials, an organic-inorganic hybrid material, wherein an inorganic component is nanoscopically dispersed in organic polymer matrix, attracts attention and is studied to draw an advantage of the in organic component and realize the hybrid synergy. Similarly, a functionalized organic-inorganic hybrid material making use of an advantage of the inorganic material attracts attention as well.

Recently, organic photoreceptors (OPCs) are widely used instead of inorganic photoreceptors for copiers, facsimiles, laser printers and their complex machines because of their good performances and advantages. Specific examples of the reasons include (1) optical properties such as a wide range of light absorbing wavelength and a large amount of absorbing light; (2) electrical properties such as high sensitivity and stable chargeability; (3) choice of the materials; (4) good manufacturability; (5) low cost; (6) non-toxicity, etc.

In these circumstances, as image forming apparatuses are being downsized, photoreceptors are having smaller diameters. In addition, photoreceptors are required to have high durability as image forming apparatuses produce images at a higher speed and are free from maintenance.

Against this requirement, the organic photoreceptor typically has a soft surface layer mainly formed from a low-molecular-weight charge transport material and an inactive polymer, and therefore the organic photoreceptor typically has a drawback of being mechanically abraded with an image developer and a cleaner with ease when repeated used in the electrophotographic process. In addition, as toner particles has smaller particle diameters due to requirements for high-quality images, cleaning blades need to have higher rubber hardness and higher contact pressure for the purpose of increasing cleanability, and which also accelerates abrading photoreceptors. Such abrasions of photoreceptors deteriorate electrical properties thereof such as sensitivities and chargeabilities, and cause abnormal images such as image density deterioration and background fouling. When a photoreceptor is locally abraded, images having black stripes due to defective cleaning are produced. At present, photoreceptors are exchanged because of these abrasions and damages.

As mentioned above, trials to improve the durability of the organic photoreceptors, i.e., to prolong lives thereof are continued. The lives of the organic photoreceptors have been dependent on the electrostatic strength and mechanical strength of the photosensitive layers against scratches caused by papers, cleaning blades and separation picks, etc. contacting the surface thereof. Lately, the electrostatic durability has been improved with selected photoreceptor materials. However, a binder for use in a surface layer of the organic photoreceptor, which is better than polycarbonate, has not been found yet.

Because of these reasons, a need exists for an organic photoreceptor having high durability and less abrasion.

For example, as methods of improving the abrasion resistance of a photoreceptor, (a) Japanese Laid-Open Patent Publication No. 56-48637 discloses a photoreceptor using a hardening binder in its surface layer; (b) Japanese Laid-Open Patent Publication No. 64-1728 discloses a photoreceptor using charge transport polymer material; and (c) Japanese Laid-Open Patent Publications Nos. 4-281461, 61-132954, 2-240655, 7-26140, 5-306335, 6-32884 and 6-282094 disclose a photoreceptor having a surface layer wherein an inorganic filler is dispersed.

In addition, Japanese Laid-Open Patent Publications Nos. 56-117245, 63-91666 and 1-205171 disclose a method of improving the mechanical strength by including particulate silica in the surface layer of a photoreceptor. In addition, Japanese Laid-Open Patent Publications Nos. 57-176057, 61-117558 and 3-155558 disclose a method of including a hydrophobic particulate silica in the outermost layer of a photoreceptor, which is the particulate silica surface-treated with a silane coupling agent, etc., to enlarge the mechanical strength thereof and impart lubricity thereto such that the photoreceptor has high durability.

In addition, Japanese Laid-Open Patent Publication No. 2000-105474 discloses a method of hydrolyzing and polycondensating alkoxysilane under the presence of a polycarbonate resin to improve the abrasion and damage resistance of a photoreceptor.

Further, Japanese Laid-Open Patent Publication No. 2002-241483 discloses a method of preparing an organic-inorganic hybrid polymer material, i.e., terminally silyl-modified polycarbonate. In addition, Japanese Laid-Open Patent Publication No. 11-209596 discloses a method of preparing an organic-inorganic hybrid material by hydrolyzing and polycondensating a polymer having polycarbonate and/or polyarylate as a main skeleton and a metal alkoxide group as a functional group.

In addition, Japanese Patent No. 3368415 and Japanese Laid-Open Patent Publication No. 2003-98710 disclose a method of preparing an electrophotographic photoreceptor comprising an electroconductive substrate and a photosensitive layer thereon, wherein an outermost layer thereof comprises a charge transport polymer material, an inorganic filler and particulate acrylic modified polyorganosiloxane, and wherein an aromatic polycarbonate resin synthesized from charge transportable diol is used as the charge transport polymer material.

SUMMARY OF THE INVENTION

Accordingly, an object of the present invention is to provide a charge transportable organic-inorganic hybrid material having good abrasion resistance and mechanical strength effectively used for an organic electron device, particularly for an electrophotographic photoreceptor.

Another object of the present invention is to provide a method of preparing the charge transportable organic-inorganic hybrid material.

A further object of the present invention is to provide an electrophotographic photoreceptor comprising the charge transportable organic-inorganic hybrid material, having good damage and abrasion resistance, and being capable of producing high-quality images for long periods.

Another object of the present invention is to provide a process cartridge comprising the electrophotographic photoreceptor.

A further object of the present invention is to provide an image forming apparatus comprising the process cartridge.

Another object of the present invention is to provide an image forming method using the image forming apparatus.

These objects and other objects of the present invention, either individually or collectively, have been satisfied by the discovery of an organic-inorganic hybrid material, comprising a charge transportable organic polymer and a metal oxide.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

Figure 1A:
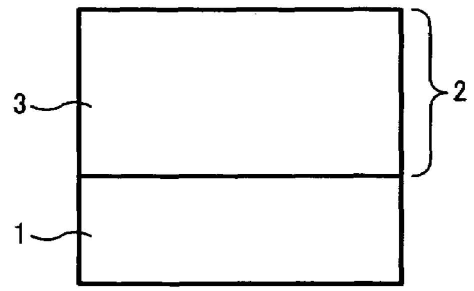
FIGS. 1A and 1B are cross-sectional views of embodiments of coated layers of the electrophotographic photoreceptor of the present invention.

The present invention provides a charge transportable organic-inorganic hybrid material having good abrasion resistance and mechanical strength effectively used for an organic electron device, particularly for an electrophotographic photoreceptor; a preparation method thereof; and an electrophotographic photoreceptor prepared therewith, having good damage and abrasion resistance, and producing high-quality images for long periods.

The present invention relates to an organic-inorganic hybrid material formed from a combination of an organic polymer having the following formulae (1) to (5) and a metal oxide. The. organic-inorganic hybrid material can be prepared by hydrolyzing and polycondensing a metal alkoxide of a polymer for hybrid material, i.e., a metal alkoxide group combined with the organic polymer having the formulae (1) to (5):

(1)

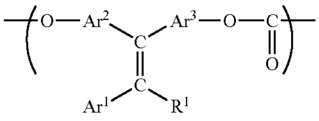

wherein $R^1$ represents a hydrogen atom, an alkyl group or an aryl group, $Ar^1$ represents an aryl group, and $Ar^2$ and $Ar^3$ each, independently, represent an arylene group;

(2)

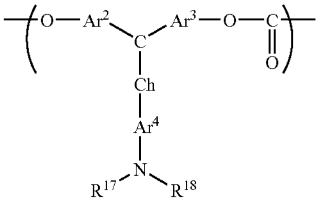

wherein $Ar^2$, $Ar^3$ and $Ar^4$each, independently, represent an arylene group, and $R^{17}$ and $R^{18}$ each, independently, represent an acyl group, an alkyl group or an aryl group;

(3)

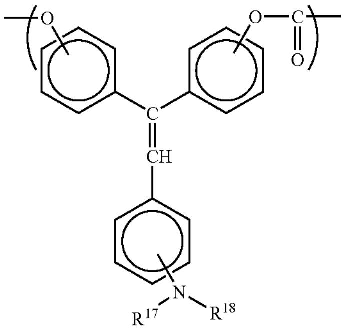

wherein $R^{17}$ and $R^{18}$ each, independently, represent an acyl group, an alkyl group or an aryl group;

(4)

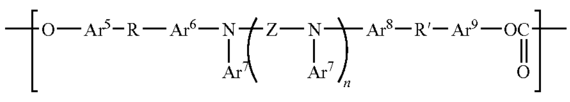

wherein $Ar^5$, $Ar^6$, $Ar^8$ and $Ar^9$ each, independently, represent an arylene group, $Ar^7$ represents an aryl group, Z represents an arylene group or —$Ar^{10}$-Za-$Ar^{10}$— wherein $Ar^{10}$ represents an arylene group and Za represents O, S or an alkylene group, R and R' each, independently, represent a straight-chain or a branched-chain alkylene group, and n represents 0 or 1;

(5)

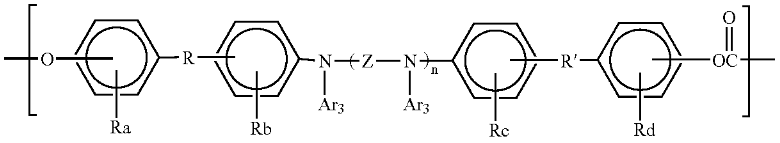

wherein Ra, Rb, Rc and Rd each, independently, represent an alkyl group, $Ar^3$ represents an aryl group, Z represents an arylene group or $-Ar^{10}$-Za-$Ar^{10}$- wherein $Ar^{10}$ represents an arylene group and Za represents O, S or an alkylene group, R and R' each, independently, represent a straight-chain or a branched-chain alkylene group, and n represents 0 or 1.

The polymer for hybrid material can be prepared by combining at least an organic polymer including a charge-transportable polycarbonate structure with a metal alkoxide compound (hereinafter referred to as a metal alkoxide) having a functional group reactable with a functional group included in the organic polymer. Namely, the organic polymer including a charge-transportable polycarbonate structure needs to include at least one functional group, and preferably two or more functional groups, in the molecule. Such functional groups are not particularly limited, provided reactable with the functional group of the metal alkoxide.

Specific examples of the functional groups include, a hydroxyl group, an amino group, a carboxyl group, a thiol group, an alkenyl group, an alkynyl group, an acid halogen group, an acid ester group, a formyl group, a halogen group, an epoxy group, isocyanate group, etc. A functional group having an active hydrogen, such as the hydroxyl group, amino group and carboxyl group, is preferably used. The hydroxyl group is most preferably used.

The organic polymer including a charge-transportable polycarbonate structure can be prepared by reacting any known bisphenol with a carbonic acid derivative, e.g., an ester exchange method between diol and bisarylcarbonate, a solution or an interfacial polymerization method between diol and an halogenated carbonyl compound such as phosgene or a method using chloroformate such as bischloroformate induced from diol.

Specific examples of the halogenated carbonyl compound include, besides the phosgene, trichloromethylchloroformate, i.e., dimeric phosgene, bis(trichloromethyl)carbonate, i.e., trimeric phosgene, and halogenated carbonyl compounds induced from halogen other than chlorine, such as carbonyl bromide and carbonyl iodide. These halogenated carbonyl compounds can be prepared by known methods.

When the organic polymer including a charge-transportable polycarbonate structure (hereinafter referred to as a polycarbonate resin), a combination of at least one of charge-transportable diol having the following formulae (12) to (14) and diol having the following formula (17) becomes a copolymer having improved mechanical properties.

(12)

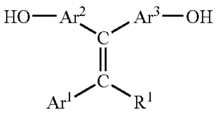

wherein $R^1$ represents a hydrogen atom, an alkyl group or an aryl group, $Ar^1$ represents an aryl group and $Ar^2$ and $Ar^3$ each, independently, represent an arylene group.

Specific examples of the alkyl group of $R^1$ include a straight-chain, a branched-chain or a cyclic alkyl group having 1 to 6 carbon atoms. These alkyl groups may further include a fluorine atom, a cyano group, a phenyl group, a halogen atom or a phenyl group substituted with a straight-chain or a branched-chain alkyl group having 1 to 5 carbon atoms. Specific examples of the straight-chain or branched-chain alkyl group include methyl groups, ethyl groups, n-propyl groups, i-propyl groups, t-butyl groups, s-butyl groups, n-butyl groups, i-butyl groups, trifluoromethyl groups, 2-cyanoethyl groups, benzyl groups, 4-chlorobenzyl groups, 4-methylbenzyl groups, cyclopentyl groups, cyclohexyl groups, etc.

Specific examples of the aryl group of $R^1$ include phenyl groups, naphthyl groups, biphenylyl groups, terphenylyl groups, pyrenyl groups, fluorenyl groups, 9,9-dimethyl- fluorenyl groups, azulenyl groups, anthryl groups, triphenylenyl groups, chrysenyl groups, fluorenylidenephenyl groups, 5H-dibenzo[a,d]cycloheptenylidenephenyl groups, thienyl groups, benzothienyl groups, furyl groups, benzoflanyl groups, carbazolyl groups, pyridinyl groups, pyrrolidyl groups, oxazolyl groups, etc. These aryl groups may have the above-mentioned alkyl groups; alkoxy groups having the above-mentioned alkyl groups; halogen atoms such as a fluorine atom, a chlorine atom, a bromine atoms and an iodine atom; and amino groups having the following formula as substituents:

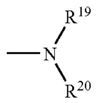

wherein $R^{19}$ and $R^{20}$ each, independently, represent the same alkyl groups or aryl groups of $R^1$, may form a ring together, and $R^{19}$ or $R^{20}$ may form a ring together with a carbon atom on the aryl group.

Specific examples of such amino groups include piperidino groups, morpholino groups, pyrrolidino groups, etc.

Specific examples of the aryl group of $Ar^1$ include groups having the following formula (a) and monovalent groups induced from heterocyclic groups having an amine structure, such as pyrrole, pyrazole, imidazole, triazole, dioxazole, indole, isoindole, benzimidazole, benzotriazole, benzoisoxadine, carbazole and phenoxadine. These aryl groups may have the same alkyl groups, aryl groups, fluorine atom, chlorine atom, bromine atom and iodine atom of $R^1$ as substituents.

(a)

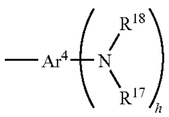

wherein $R^{17}$ and $R^{18}$ each, independently, represent an acyl group, an alkyl group and an aryl; $Ar^4$ represents an arylene group; and h represents an integer of from 1 to 3.

Specific examples of the acyl group include an acetyl group, a propionyl group, benzoyl group, etc. Specific examples of the alkyl group include groups have the following formula (8) besides the same alkyl groups of $R^1$:

(b)

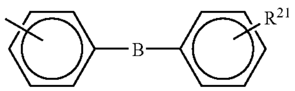

wherein B represents —O—, —S—, —SO—, —$SO_2$—, —CO— and the following bivalent groups:

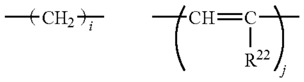

wherein $R^{21}$ represents a hydrogen atom, the same alkyl groups of $R^1$, an alkoxy group, a halogen atom, the same aryl groups of $R^1$, an amino groups, a nitro group and a cyano group; $R^{22}$ represents a hydrogen atom, the same alkyl groups of $R^1$ and the same aryl groups of $R^1$; i represents an integer of from 1 to 12; and j represents an integer of from 1 to 3.

Specific examples of the alkoxy group include a methoxy group, an ethoxy group, a n-propoxy group, an i-propoxy group, a n-butoxy group, an i-butoxy group, a s-butoxy group, a t-butoxy group, a 2-hydroxyethoxy group, 2-cyanoethoxy group, a benzyloxy group, a 4-methylbenzyloxy group, a trifluoromethoxy group, etc.

Specific examples of the halogen atom include a fluorine atom, a chlorine atom, a bromine atom and an iodine atom.

(13)

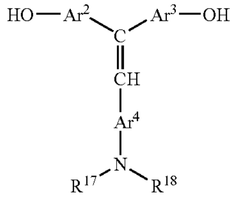

wherein $Ar^2$, $Ar^3$ and $Ar^4$ each, independently, represent an arylene group, and $R^{17}$ and $R^{18}$ independently represent an acyl group, an alkyl group or an aryl group.

(14)

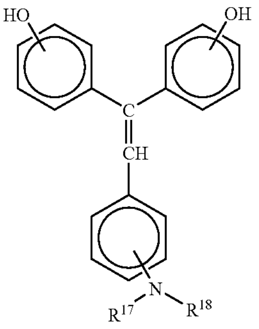

wherein $R^{17}$ and $R^{18}$ each, independently, represent an acyl group, an alkyl group or an aryl group.

(15)

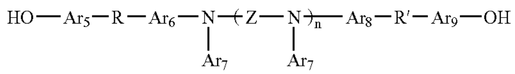

wherein $Ar^5$, $Ar^6$, $Ar^8$ and $Ar^9$ each, independently, represent an arylene group, $Ar^7$ represents an aryl group, Z represents an arylene group or -$Ar^{10}$-Za-$Ar^{10}$- wherein $Ar^{10}$ represents an arylene group and Za represents O, S or an alkylene group, R and R' each, independently, represent a straight-chain or a branched-chain alkylene group, and n represents 0 or 1.

(16)

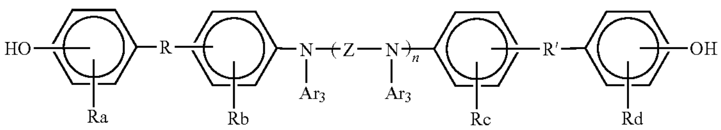

Specific examples of the amino group include the same amino groups which are substituents of the aryl groups of $R^1$.

Specific examples of the arylene group of $Ar^4$ include bivalent groups induced from the same aryl groups of $R^1$.

In the formula (1), $Ar^2$ and $Ar^3$ each, independently, represent an arylene group. Specific examples of the arylene group bivalent groups induced from the same aryl groups of $R^1$.

wherein Ra, Rb, Rc and Rd each, independently, represent an alkyl group, $Ar^3$ represents an aryl group, Z represents an arylene group or -$Ar^{10}$-Za-$Ar^{10}$- wherein $Ar^{10}$ represents an arylene group and Za represents O, S or an alkylene group, R and R' each, independently, represent a straight-chain or a branched-chain alkylene group, and n represents 0 or 1.

Specific examples of the aryl group of $Ar^7$include phenyl groups, naphthyl groups, biphenylyl groups, terphenylyl groups, pyrenyl groups, fluorenyl groups, 9,9-dimethyl-fluorenyl groups, azulenyl groups, anthryl groups, triphenylenyl groups, chrysenyl groups, fluorenylidenephenyl groups, 5H-dibenzo[a,d]cycloheptenylidenephenyl groups, thienyl groups, benzothienyl groups, furyl groups, benzof lanyl groups, carbazolyl groups, pyridinyl groups, pyrrolidyl groups, oxazolyl groups, etc. These aryl groups may have the above-mentioned alkyl groups; alkoxy groups having the above-mentioned alkyl groups; halogen atoms such as a fluorine atom, a chlorine atom, a bromine atoms and an iodine atom; and amino groups having the following formula as substituents:

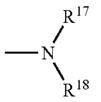

wherein $R^{17}$ and $R^{18}$ each, independently, represent the same alkyl groups or aryl groups of $R^1$, may form a ring together, and $R^{17}$ or $R^{18}$ may form a ring together with a carbon atom on the aryl group.

Specific examples of such amino groups include piperidino groups, morpholino groups, pyrrolidino groups, etc. Specific examples of the alkyl group of include a straight-chain, a branched-chain or a cyclic alkyl group having 1 to 5 carbon atoms. These alkyl groups may further include a fluorine atom, a cyano group, a phenyl group, a halogen atom or a phenyl group substituted with a straight-chain or a branched-chain alkyl group having 1 to 5 carbon atoms. Specific examples of the straight-chain or branched-chain alkyl group include methyl groups, ethyl groups, n-propyl groups, i-propyl groups, t-butyl groups, s-butyl groups, n-butyl groups, i-butyl groups, trifluoromethyl groups, 2-cyanoethyl groups, benzyl groups, 4-chlorobenzyl groups, 4-methylbenzyl groups, etc.

In the formula (9), $Ar^5$, $Ar^6$, $Ar^8$ and $Ar^9$ are bivalent groups induced from the aryl groups of $Ar^7$.

In the formula (9), Z includes phenylene, naphthylene, biphenylene, terphenylene, pyrene-1,6-diyl, fluorene-2,7-diyl, 9,9-dimethylfluorene-2,7-diyl, thiophene-2,5-diyl, flane-2,5-diyl, N-ethlcarbazole-3,6-diyl, etc. These may have an alkyl group, an alkoxy group and a halogen atom as a substituent.

Specific examples of the alkyl group of Ra, Rb, Rc and Rd include a straight-chain, a branched-chain or a cyclic alkyl group having 1 to 5 carbon atoms. These alkyl groups may further include a fluorine atom, a cyano group, a phenyl group, a halogen atom or a phenyl group substituted with a straight-chain or a branched-chain alkyl group having 1 to 5 carbon atoms. Specific examples of the straight-chain or branched-chain alkyl group include methyl groups, ethyl groups, n-propyl groups, i-propyl groups, t-butyl groups, s-butyl groups, n-butyl groups, i-butyl groups, trifluoromethyl groups, 2-cyanoethyl groups, benzyl groups, 4-chlorobenzyl groups, 4-methylbenzyl groups, etc.

$$HO—X—OH \quad (17)$$

wherein X represents an aliphatic bivalent group, a cyclic aliphatic bivalent group or a combination thereof, or the following formulae (c) or (d):

(c)

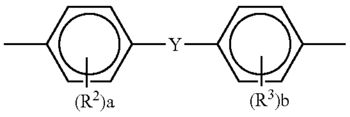

(d)

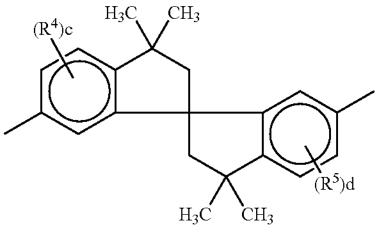

wherein $R^2$, $R^3$, $R^4$ and $R^5$ each, independently, represent an alkyl group, an aryl group or a halogen atom; a and b each, independently, represent 0 or an integer of from 1 to 4; c and d each, independently, represent 0 or an integer of from 1 to 3; Y represents a single bond, a straight-chain alkylene group having 2 to 12 carbon atoms, —O—, —S—, —SO—, —$SO_2$—, —CO— or any one of groups having the following formulae (e) to (m):

(e)

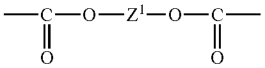

(f)

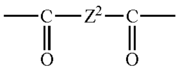

(g)

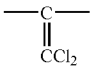

(h)

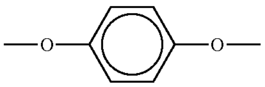

(i)

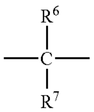

(j)

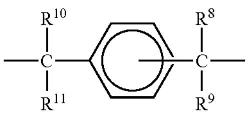

(k)

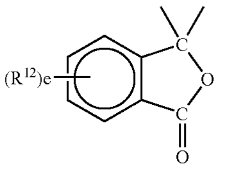

(l)

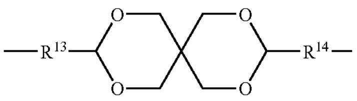

-continued

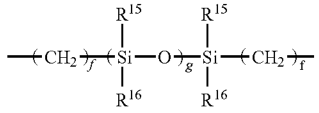

(m)

wherein $Z^1$ and $Z^2$ each, independently, represent an aliphatic bivalent group or an arylene group; $R^6$, $R^7$, $R^8$, $R^9$, $R^{10}$, $R^{11}$ and $R^{12}$ each, independently, represent a hydrogen atom, a halogen atom, an alkyl group having 1 to 5 carbon atoms, an alkoxy group having 1 to 5 carbon atoms or an aryl group; $R^6$ and $R^7$ may be combined to form a carbon ring or a heterocyclic ring having 6 to 12 carbon atoms, and may form a carbon ring or a heterocyclic ring together with $R^2$ and $R^3$; $R^{13}$ and $R^{14}$ each, independently, represent a single bond or an alkylene group having 1 to 4 carbon atoms; $R^{15}$ and $R^{16}$ each, independently, represent an alkyl group having 1 to 5 carbon atoms or an aryl group; e is 0 or an integer of from 1 to 4; f is 0 or an integer of from 1 to 20; and g is 0 or an integer of from 1 to 2,000.

Specific examples of the diol having the formula (12) when X is an aliphatic bivalent group, a cyclic aliphatic bivalent group or a combination thereof include ethylene glycol, diethylene glycol, triethylene glycol, polyethylene glycol, polytetramethyleneether glycol, 1,3-propanediol, 1,4-butandiol, 1,5-pentandiol, 3-methyl-1,5-pentanediol, 1,6-hexanediol, 1,5-hexanediol, 1,7-heptanediol, 1,8-octanediol, 1,9-nonanediol, 1,10-decanediol, 1,11-undecanediol, 1,12-dodecanediol, neopentyl glycol, 2-ethyl-1,6-hexanediol, 2-methyl-1,3-propanediol, 2-ethyl-1,3-propanediol, 2-ethyl-1,3-propanediol, 2,2-dimethyl-1,3-propanediol, 1,3-cyclohexanediol, 1,4-cyclohexanediol, cyclohexane-1,4-dimethanol, 2,2-bis(4-hydroxycyclohexyl)propane, xylilene diol, 1,4-bis(2-hydroxyethyl)benzene, 1,4-bis(4-hydroxybutyl)benzene, 1,4-bis(6-hdroxyhexyl)benzene, isophorone diol, etc.

When X is an aromatic bivalent group, the diol includes bivalent groups induced from aryl groups of $Ar^7$.

Specific examples of Y having at least one alkylene group having 1 to 10 carbon atoms and at least one oxygen atom and one sulfur atom include $OCH_2CH_2O$, $OCH_2CH_2OCH_2CH_2O$, $OCH_2CH_2OCH_2CH_2OCH_2CH_2O$, $OCH_2CH_2CH_2O$, $OCH_2CH_2CH_2CH_2O$, $OCH_2CH_2CH_2CH_2CH_2CH_2O$, $OCH_2CH_2CH_2CH_2CH_2CH_2CH_2CH_2O$, $CH_2O$, $CH_2CH_2O$, CHEtOCHEtO, $CHCH_3O$, $SCH_2OCH_2S$, $CH_2OCH_2$, $OCH_2OCH_2O$, $SCH_2OCH_2OCH_2CH_2CH_2S$, $OCH_2CH_3OCH_2CHCH_3O$, $SCH_2CH_2S$, $SCH_2CH_2CH_2S$, $SCH_2CH_2CH_2CH_2S$, $SCH_2CH_2CH_2CH_2CH_2CH_2S$, $SCH_2CH_2SCH_2CH_2S$, $SCH_2CH_2OCH_2CH_2CH_2CH_2OCH_2CH_2S$, etc.

When $Z^1$ and/or $Z^2$ are respectively an aliphatic bivalent group, $Z^1$ and $Z^2$ include bivalent groups excluding a hydroxy group from the diols when X is an aliphatic bivalent group, a cyclic aliphatic bivalent group or a combination thereof.

When $Z^1$ and/or $Z^2$ are respectively an arylene group, $Z^1$ and $Z^2$ include bivalent groups induced from aryl groups.

Specific preferred examples of the diol when X is an aromatic bivalent group include bis(4-hydroxyphenyl)methane, bis(2-methyl-4-hydroxyphenyl)methane, bis(3-methyl-4-hydroxyphenyl)methane, 1,1-bis(4-hydroxyphenyl)ethane, 1,2-bis(4-hydroxyphenyl)ethane, bis(4-hydroxyphenyl)phenylmethane, bis(4-hydroxyphenyl)diphenylmethane, 1,1-bis(4-hydroxyphenyl)-1-phenylethane, 1,3-bis(4-hydroxyphenyl)-1,1-dimethylpropane, 2,2-bis(4-hydroxyphenyl)propane, 2-(4-hydroxyphenyl)-2-(3-hydroxyphenyl)propane, 1,1-bis(4-hydroxyphenyl)-2-methylpropane, 2,2-bis(4-hydroxyphenyl)butane, 1,1-bis(4-hydroxyphenyl)-3-methylpropane, 2,2-bis(4-hydroxyphenyl)pentane, 2,2-bis(4-hydroxyphenyl)-4-methylpentane, 2,2-bis(4-hydroxyphenyl)hexane, 4,4-bis(4-hydroxyphenyl)heptane, 2,2-bis(4-hydroxyphenyl)nonane, bis(3,5-dimethl-4-hydroxyphenyl)methane, 2,2-bis(3-methyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-tert-butyl-4-hydroxyphenyl)propane, 2,2-bis(3-cyclohexyl-4-hydroxyphenyl)propane, 2,2-bis(3-alyl-4-hydroxyphenyl)propane, 2,2-bis(3-phenyl-4-hydroxyphenyl)propane, 2,2-bis(3,5-dimethyl-4-hydroxyphenyl)propane, 2,2-bis(3-chloro-4-hydroxyphenyl)propane, 2,2-bis(3,5-dichloro-4-hydroxyphenyl)propane, 2,2-bis(3-bromo-4-hydroxyphenyl)propane, 2,2-bis(3,5-dibromo-4-hydroxyphenyl)propane, 2,2-bis(4-hydroxyphenyl)hexafluoropropane, 1,1-bis(4-hydroxyphenyl)cyclopentane, 1,1-bis(4-hydroxyphenyl)cyclohexane, 1,1-bis(3-methyl-4-hydroxyphenyl)cyclohexane, 1,1-bis(3,5-dimethyl-4-hydroxyphenyl)cyclohexane, 1,1-bis(3,5-dichloro-4-hydroxyphenyl)cyclohexane, 1,1-bis(4-hydroxyphenyl)-3,3,5-trimethylcycloehxane, 1,1-bis(4-hydroxyphenyl)cycloheptane, 2,2-bis(4-hydroxyphenyl)norbornene, 2,2-bis(4-hydroxyphenyl)adamantane, 4,4'-dihydroxydiphenylether, 4,4'-dihydroxy-3,3'-dimethyldiphenylether ethyleneglycolbis(4-hydroxyphenyl)ether, 1,3-bis(4-hydroxyphenoxy)benzene, 1,4-bis(3-hydroxyphenoxy)benzene, 4,4'-dihydroxydiphenylsulfide 3,3'-dimethyl-4,4'-dihydroxydiphenylsulfide, 3,3',5,5'-tetramethyl-4,4'-dihydroxydiphenylsulfide, 4,4'-dihydroxydiphenylsulfoxide, 3,3'-dimethyl-4,4'-dihydroxydiphenylsulfoxide, 4,4'-dihydroxydiphenylsulfone, 3,3'-dimethyl-4,4°-dihydroxydiphenylsulfone, 3,3'-dipheyl-4,4'-dihydroxydiphenylsulfone, 3,3'-dichloro-4,4'-dihydroxydiphenylsulfone, bis(4-hydroxyphenyl)ketone, bis(3-methyl-4-hydroxyphenyl)ketone, 3,3,3',3'-tetramethyl-6,6'-dihydroxyspiro(bis)indane, 3,3',4,4'-tetrahydro-4,4,4',4'-tetramethyl-2,2'-spirobis(2H-1-benzopyrane)-7,7'-diol, trans-2,3-bis(4-hydroxyphenyl)-2-butene, 9,9-bis(4-hydroxyphenyl)fluorene, 9,9-bis(4-hydroxyphenyl)xanthene, 1,6-bis(4-hydroxyphenyl)-1,6-hexanedione, α, α, α, α'-tetramethyl- α, α'-bis(4-hydroxyphenyl)-p-xylene, α, α, α', α'-tetramethyl-α, α'-bis(4-hydroxyphenyl)-m-xylene, 2,6-dihydroxydibenzo-p-dioxyne, 2,6-dihydroxythianthrene, 2,7-dihydroxyphenoxathiin, 9,10-dimethyl-2,7-dihydroxyphenazine, 3,6-dihydroxydibenzofuran, 3,6-dihydroxydibenzothiophene, 4,4'-dihydroxybiphenyl, 1,4-dihydroxynaphthalene, 2,7-dihydroxypyrene, hydroquinone, resorcin, 4-hydroxyphenyl-4-hydroxybenzoate, ethyleneglycol-bis(4-hydroxybenzoate), diethyleneglycol-bis(4-hydroxybenzoate), triethyleneglycol-bis(4-hydroxybenzoate), p-phenylene-bis(4-hydroxybenzoate), 1,6-bis(4-hydroxybenzoyloxy)-1H,1H,6H,6H-perfluorohexane, 1,4-bis(4-hydroxybenzoyloxy)-1H,1H,4H,4H-perfluorobutane, 1,3-bis(hydroxyphenyl)tetramethyldisiloxane, phenol-modified silicone oil, etc.

The contents of the charge transportable diols having the above-mentioned formulae (12) to (14) and of the diol having the above-mentioned formula (17) can be determined as desired. In addition, the contents (k) of the organic polymer having any one of the above-mentioned formulae (1) to (3) and the content (j) of the organic polymer having a formula (6) mentioned later preferably satisfy the following relationship:

$$0<k/(k+j)\leqq 1$$

The organic polymer preferably has a number-average molecular weight of from 400 to 40,000, and more preferably from 1,000 to 10,000. When less than 400, the resultant hybrid material has deficient properties as a polymer. When greater than 40,000, the organic polymer has less metal alkoxide and the resultant hybrid material does not fully draw properties of an inorganic material.

Further, suitable polymerization operations can prepare a variety of copolymers such as a random copolymer, an alternating copolymer, a block copolymer, a random alternating copolymer and a random block copolymer.

For example, when the charge transportable diols having the formulae (12) to (14) and the diol having the formula (17) are uniformly mixed from the beginning and the mixture is subjected to a condensation reaction with phosgene, a random copolymer including a constituent having the formula (1), (2) or (3) and another constituent having the formula (6).

Alternatively, when some diols are added while the mixture is subjected to a condensation reaction with phosgene, a random block copolymer can be prepared. When a bischloroformate induced from the diol having the formula (17) and the charge transportable diols having the formulae (12) to (14) are subjected to a condensation reaction, an alternating copolymer including repeat units having the following formulae (18) to (22) can be obtained.

(18)

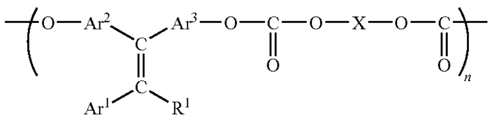

wherein $R^1$, $Ar^1$, $Ar^2$, $Ar^3$ and X are same as mentioned above, and n represents an integer o from 2 to 5,000.

(19)

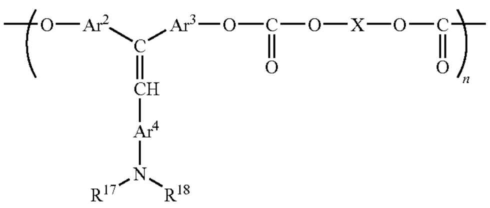

wherein $Ar^2$, $Ar^3$, $Ar^4$, $R^{17}$, $R^{18}$ and X are same as mentioned above, and n represents an integer of from 2 to 5,000.

(20)

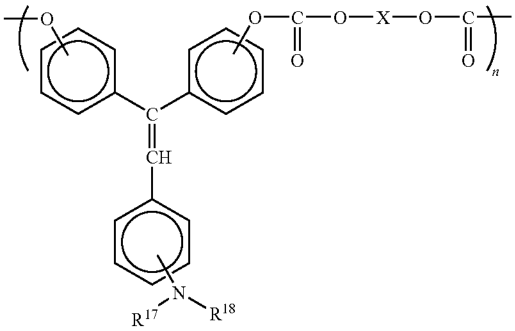

wherein $R^{17}$, $R^{18}$ and X are same as mentioned above, and n represents an integer of from 2 to 5,000.

(21)

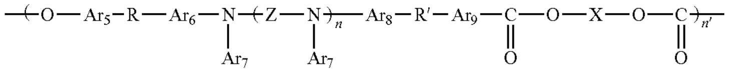

wherein $Ar^5$, $Ar^6$, $Ar^8$ and $Ar^9$ each, independently, represent an arylene group, $Ar^7$ represents an aryl group, Z represents an arylene group or —$Ar^{10}$-Za-$Ar^{10}$— wherein $Ar^{10}$ represents an arylene group and Za represents O, S or an alkylene group, R and R' each, independently, represent a straight-chain or a branched-chain alkylene group, n represents 0 or 1, and n' represents an integer of from 2 to 5,000.

(22)

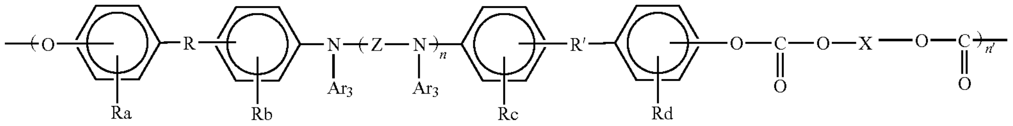

wherein Ra, Rb, Rc and Rd each, independently, represent an alkyl group, $Ar^3$ represents an aryl group, Z represents an arylene group or -$Ar^{10}$-Za-$Ar^{10}$- wherein $Ar^{10}$ represents an arylene group and Za represents O, S or an alkylene group, R and R' each, independently, represent a straight-chain or a branched-chain alkylene group, n represents 0 or 1, and n' represents an integer of from 2 to 5,000.

Even when a bischloroformate induced from the charge transportable diols having the formulae (12) to (14) and the diol having the formula (17) are subjected to a condensation reaction, an alternating copolymer including repeat units having the (18) to (22) can also be obtained.

In addition, when plurality of the bischloroformate and the diols are subjected to a condensation reaction, a random alternating copolymer can be obtained.

In an interfacial polymerization method using a halogenated carbonyl compound or a chloroformate, a reaction between a diol alkali solution and a solution substantially insoluble in water and dissolving a polycarbonate resin is performed under the presence of a carbonic acid derivative and a catalyst. When the reaction catalyst is emulsified by high-speed agitation or addition of an emulsifying material, a polycarbonate resin having a narrow molecular weight distribution can be prepared in a short time.

Specific examples of the base for use in the alkali solution include hydroxides and carbonates of alkaline metals or alkaline earth metals such as sodium hydroxide, kalium hydroxide, calcium hydroxide, sodium carbonate, kalium carbonate, calcium carbonate and sodium hydrogen carbonate. These bases can be used alone or in combination. Among these bases, sodium hydroxide and kalium hydroxide are preferably used. Distilled water and ion-exchanged water are preferably used in the alkali solution.

Specific examples of an organic solvent dissolving a polycarbonate resin include aliphatic halogenated hydrocarbon such as dichloromethane, 1,2-dichloroethane, 1,2-dichloroethylene, trichloroethane, tetrachloroethan, dichloropropane and mixtures thereof. Further, the organic solvents may include an aromatic hydrocarbon such as toluene, xylene and ethylbenzene; and an aliphatic hydrocarbon such as hexane and cyclohexane. The organic solvent is preferably aliphatic halogenated hydrocarbon or aromatic halogenated hydrocarbon, and more preferably dichloromethane or chlorobenzene.

Specific examples of a polycarbonate production catalyst when a polycarbonate resin is prepared include, but are not limited to, a tertiary amine, a quaternary amine, a tertiary phosphine, a quaternary phosphonium salt, heterocyclic compounds including a nitrogen atom and their salts, imino ethers and their salts and compounds having an amide group such as trimethylamine, triethylamine, tri-n-propylamine, tri-n-hexylamine, N,N,N',N'-tetramethyl-1,4-tetramethylenediamine, 4-pyrrolidinopyridine, N,N'-dimethylpiperazine, N-ethylpiperidine, benzyltrimethylammoniumchloride, benzyltriethylammoniumchloride, tetramethylammoniumchloride, tetramethylammoniumchloride, tetraethylammoniumbromide, phenyltriethylammoniumchloride, triethylphosphine, triphenylphosphine, diphenylbutylphosphine, tetra(hydroxymethyl)phosphoniumchloride, benzyltriethylphosphoniumchloride, 4-methylpyridine, 1-methlimidazole, 1,2-dimethylimidazole, 3-methylpyridazine, 4,6-dimethylpyrimidine, 1-cyclohexyl-3,5-dimethylpyrazole and 2,3,5,6-tetramethylpyrazine.

Among these polycarbonate production catalysts, tertiary amines are preferably used, tertiary amines having 3 to 30 carbon atoms are more preferably used, and triethylamine is even more preferably used. These polycarbonate production catalysts can be used alone or in combination. These catalysts can be added before and/or after a carbonic acid derivative such as phosgene and bischloroformate is added.

In addition, an antioxidant such as hydrosulfite may be added to prevent the diol from being oxidized in the alkali solution. The reaction temperature is preferably from 0 to 40° C., the reaction time is preferably from a few min to 5 hrs, and the pH is preferably kept at not less than 10.

On the other hand, a solution polymerization method includes dissolving diol in a solvent to prepare a solution, adding a deoxidizing agent thereto, and adding a multimer, i.e., bischloroformate or phosgene to prepare a polycarbonate resin.

Specific examples of the deoxidizing agent include tertiary amines such as trimethylamine, triethylamine and tripropylamine; and pyridine.

Specific examples of the solvent include halogenated hydrocarbon such as dichloromethane, dichloroethane, trichloroethane, trichloroethylene and chloroform; cyclic ether solvents such as tetrahydrofuran and dioxane; and pyridine. The reaction temperature is preferably from 0 to 40° C., and the reaction time is preferably from a few min to 5 hrs.

In addition, an ester exchange method can also prepare a polycarbonate resin, wherein diol and bisallylcarbonate are mixed under the presence of an inactive gas, and reacted with each other under reduced pressure at from 120 to 350° C.; the pressure is reduced by stages to 1 mm Hg or less and produced phenols are distilled away. The reaction time is 1 to 4 hrs.

An antioxidant may optionally be added to the reaction. Specific examples of the bisallylcarbonate include diphenylcarbonate, di-p-tolylcarbonate, phenyl-p-tolylcarbonate, di-p-chlorophenylcarbonate, dinaphthylcarbonate, etc.

An organic polymer including a polycarbonate resin having at least one, preferably two or more, functional group, prepared by any one of the above-mentioned various methods and a metal alokoxide having a functional group reactable with the functional group in the organic polymer are reacted and combined with each other to prepare a polymer for hybrid material having a metal alkoxide group combined with the organic polymer.

The metal alkoxide for use in the present invention is preferably a compound having the following formula (A):

R1AmM(R"X')n (A)

wherein R1 represents an alkyl group having 1 to 12, preferably from 1 to 5, carbon atoms; A represents an alkoxy group having 1 to 8, preferably from 1 to 4, carbon atoms; M represents a metal element selected from the group consisting of Si, Ti, Zr, Fe, Cu, Sn, B, Al, Ge, Ce and Ta, preferably from the group consisting of Si, Ti and Zr; R" represents an alkylene group or an alkylidene group having 1 to 4, preferably from 2 to 4, carbon atoms; X' represents a functional group selected from the group consisting of isocyanate groups, epoxy groups, carboxyl groups, acid halide group and acid anhydride groups; 1 represents 0 or an integer of from 1 to 3; and m and n each, independently, represent an integer of from 1 to 3.

As mentioned above, one of Si, Ti and Zr is preferably used as a metal element in the constituent having a metal oxide bond. Particularly, Si is more preferably used. These metals facilitate synthesizing the polymer for hybrid material, and the resultant polymer has chemical stability. In addition, the polymer for hybrid material has a suitable reactivity (temperature and time), and an organic-inorganic hybrid material can easily be prepared by, e.g., hydrolyzing and polycondensating (sol-gel reaction) the polymer. The electrical, mechanical and physical properties of the organic-inorganic hybrid material are effectivelyused for organic electron devices, particularly for electrophotographic photoreceptors. A variety of metal alkoxides can be selected in accordance with the purpose.

Specific examples of the metal alkoxide having the above-mentioned formula (A) include monoisocyanate trialkoxy metals, monoisocyanate dialkoxy metals, monoisocyanate monoalkoxy metals, diisocyanate alkoxy metals, triisocyanate alkoxy metals, metal alkoxides having epoxy groups as functional groups, alkylalkoxysilanes having alkoxy groups as functional groups, metal alkoxides having acid anhydrides as functional groups, metal alkoxides having acid halides as functional groups, alkoxysilanes having amino groups or mercapto groups as functional groups, etc.

Specific examples of the monoisocyanate trialkoxy metals include 3-isocyanatepropyltriethoxysilane, 3-isocyanatepropyltrimethoxysilane, 2-isocyanateethyltriethoxysilane, 2-isocyanateethyltripropoxyzirconium, 2-isocyanateethyltributoxytin, etc.

Specific examples of the monoisocyanate dialkoxy metals include 3-isocyanatepropylethyldiethoxysilane, 3-isocyanatepropylethyldiisopropoxytitanium, 2-isocyanateethylethyldipropoxyzirconium, 2-isocyanateethylmethyldibutoxytin, isocyanatemethyldimethoxyaluminum, etc.

Specific examples of the monoisocyanate monoalkoxy metals include 3-isocyanatepropyldiethylethoxysilane, 3-isocyanatepropyldimethylisopropoxytitanium, 2-isocyanateethyldiethylpropoxyzirconium, 2-isocyanateethyldimethylbutoxytin, isocyanatemethylmethylmethoxyaluminum, etc.

Specific examples of the diisocyanate alkoxy metals include di(3-isocyanatepropyl)diethoxysilane, di(3-isocyanatepropyl)methylisopropoxytitanium, etc.

Specific examples of the triisocyanate alkoxy metals include ethoxysilanetriisocyanate, etc.

Specific examples of the metal alkoxides having epoxy groups as functional groups include γ-glycidoxypropyltriethoxysilane, γ-glycidoxypropyltrimethoxysilane, γ-glycidoxypropylmethyldimethoxysilane, γ-glycidoxypropyldimethylethoxysilane, γ-glycidoxypropylmethyldiethoxysilane, β-(3,4-epoxycyclohexyl)ethyltrimethoxysilane, 3,4-epoxybutyltrimethoxysilane, γ-glycidoxypropyltriisopropoxytitanium, γ-glycidoxypropylmethyldiisopropoxytitanium, γ-glycidoxypropyldimethylisopropoxytitanium, 3,4-epoxybutyltripropoxyzirconium, 3,4-epoxybutylmethylpropoxyzirconium, 3,4-epoxybutyldimethylpropoxyzirconium, β-(3,4-epoxycyclohexyl)ethyltriethoxytin, etc.

Specific examples of the alkylalkoxysilanes having alkoxy groups as functional groups include methyltrimethoxysilane, ethyltriethoxysilane, isopropyltriisopropoxysilane, dimethylmethoxysilane, diethyldiethoxysilane, diisopropyldiisopropoxysilane, trimethylmethoxysilane, triethylethoxysilane, triisopropylisopropoxysilane, etc.

Specific examples of the metal alkoxides having acid anhydrides as functional groups include 3-(triethoxysilyl)-2-methylpropylsuccinate anhydride, etc.

Specific examples of the metal alkoxides having acid halides as functional groups include 2-(4-chlorosulfonylphenyl)ethyltriethoxysilane, etc.

Specific examples of the alkoxysilanes having amino groups or mercapto groups as functional groups include 3-aminopropyltrimethoxysilane, 3-aminopropyltriethoxysilane, 3-mercaptopropyltrimethoxysilane, 3-mercaptopropyltriethoxysilane, etc.

Further, the metal alkoxide for use in the present invention also includes a compound having the following formula (B):

AoM (B)

wherein Ao represents an alkoxy group having 1 to 8, preferably 1 to 4, carbon atoms; M represents a metal element selected from the group consisting of SI, Ti, Zr, Fe, Cu, Sn, B, Al, Ge, Ce and Ta, preferably from the group consisting of Si, Ti and Zr.

As mentioned above, one of Si, Ti and Zr is preferably used as a metal element in the constituent having a metal oxide bond. Particularly, Si is more preferably used. The reasons are same as mentioned above.

Specific examples of the metal alkoxides having the formula (B) include tetraalkoxysilanes such as tetramethoxysilane, tetraethoxysilane and tetrabutoxysilane; and metal alkoxides such as tetrapropoxytitanium, tetraisopropoxytitanium, tetraisopropoxyzirconium, tetrapropoxyzirconium, tetrabutoxytin, tetraisopropoxytin and tetraisopropoxyaluminum.

The metal alkoxides can be used alone or in combination. In addition, a metal alkoxide including two or more metal elements in a molecule or a metal alkoxide including two or more repeat unit can also be used.

As mentioned above, the polymer for hybrid material including a charge transportable constituent of the present invention can be prepared by reacting an organic polymer including a polycarbonate resin having at least one, preferably two or more, functional group, prepared by any one of the above-mentioned various methods and a metal alokoxide having a functional group reactable with the functional group in the organic polymer. A catalyst can be used for the reaction. An embodiment of the reaction between the organic polymer and the metal alkoxide will be explained.

A polymer including a polycarbonate resin having a functional group having an active hydrogen atom such as a hydroxyl group, an amino group, a carboxyl group and a thiol group and a metal alkoxide having a functional group such as an isocyanate group, an epoxy group, a carboxyl group, an acid halogenide group and an acid anhydride group are reacted in a solvent, preferably in an atmosphere of an inactive gas. Any solvent which dissolves both of the polymer and metal alkoxide well can be used.

Typically, the metal alkoxide solution or the metal alkoxide itself is gradually added in to the polymer solution, and the reaction is performed at a room temperature or slowly heated. The number of the functional groups in the metal alkoxide to the number of the functional groups in the polymer is from 1/10 to 10/1.

After the reaction, the reaction liquid may proceed to the following step of sol-gel reaction as it is. Alternatively, after the reaction liquid is condensed or put into a large amount of a poor solvent to separate a reaction product out, the reaction product may be washed, refined, dried and subjected to the sol-gel reaction.

The thus prepared polymer for hybrid material having a metal alkoxide group combined with the organic polymer of the present invention is hydrolyzed and polycondensated by a sol-gel reaction to prepare a charge transportable organic-inorganic hybrid material. The reaction product, i.e., the charge transportable organic-inorganic hybrid material may be dissolved in the reaction liquid or isolated.

The hydrolysis and polycondensation by a sol-gel reaction is a three-dimensional crosslinking reaction wherein the polymer for hybrid material having a metal alkoxide group in the molecule is reacted with water to convert the alkoxy group into a hydroxyl group (hydroxy metal group such as —$Si(OH)_3$), and the hydroxyl group is simultaneously polycondensated with an adjacent molecule by dehydration or dealcoholization to form an inorganic covalent bond, i.e. a metal oxide bond.

Water required to convert all the alkoxy groups in the polymer for hybrid material into a hydroxyl group may separately be added to the hydrolysis reaction, water included in the reaction may be used or water in the atmosphere may be absorbed therein.

The hydrolysis and polycondensation are preferably performed at from a room temperature to 100° C. for 5 to 24 hrs. In addition, an acidic catalyst such as a hydrochloric acid, a sulfuric acid, an acetic acid, a benzenesulfonic acid and a p-toluenesulfonic acid; and a basic catalyst such as sodium hydrate, kalium hydrate, ammonia, triethylamine and piperidine may be used. In order to promote the polycondensation reaction and consolidate the crosslinkage more, it is preferable that the reaction liquid is further heated at from 50 to 400° C. for 5 min to 48 hrs. The resultant reaction liquid can be used as a coating liquid for a photoreceptor as it is.

As mentioned above, the organic-inorganic hybrid material wherein an organic material and an inorganic material are combined in a body, which is prepared by hydrolyzing and polycondensating the polymer for hybrid material, is three-dimensionally crosslinked and has properties of both of the organic material and the inorganic material, and has good abrasion resistance, mechanical strength, stiffness, surface hardness and heat resistance.

So far, the charge transportable organic-inorganic hybrid material of the present invention has been explained, and an embodiment of the electrophotographic photoreceptor including an electroconductive substrate, a photosensitive layer thereon and a surface layer thereon, which is mainly constituted of this organic-inorganic hybrid material, will be explained.

The surface layer of the electrophotographic photoreceptor of the present invention is formed by coating the above-mentioned coating liquid including a polymer for hybrid material having a metal alkoxide group combined with an organic polymer on an electroconductive substrate, and hydrolyzing, polycondensating and hardening the metal alkoxide group. The layer composition and formation of the photoreceptor will be explained later.

The coating liquid is optionally diluted with a solvent. Specific examples of the solvent include alcohols such as methanol, ethanol, propanol and butanol; ketones such as acetone, methyl ethyl ketone, methyl isobutyl ketone and cyclohexanone; esters such as ethyl acetate and butyl acetate; ethers such as tetrahydrofuran, dioxane and propylether; halogens such as dichloromethane, dichloroethane, trichloroethane and chlorobenzene; aromatics such as benzene, toluene and xylene; and Cellosoves such as methyl Cellosolve, ethyl Cellosolve and Cellosolve acetate.

These solvents can be used alone or in combination. A dilution ratio with the solvent can optionally be decided upon solubility of the compositions, a coating method and a purposed layer thickness. The surface layer can be coated by a dip coating method, a spray coating method, a bead coating method, a ring coating method, etc.

In the present invention, after the coating liquid is coated by any one of the above-mentioned coating methods, the liquid is subjected to a crosslinking reaction by sol-gel method to form a surface layer including a charge transportable organic-inorganic hybrid material. The crosslinking reaction is preferably performed at from 50 to 250° C. for 5 min to 24 hrs. When less than 50° C., the reaction speed is low and the reaction is not completely finished. When higher than 250° C., the reaction does not uniformly proceed and the resultant surface layer tends to have a large distortion. It is also effective to heat at a low temperature less than 100° C. and complete the reaction by further heating at 100° C. or more to uniformly proceed the hardening reaction. Specifically, the coating liquid is spray-coated on a photoreceptor including a substrate such as aluminum, an undercoat layer thereon, a charge generation layer thereon and a charge transport layer thereon. Then, the photoreceptor is dried at from 25 to 80° C. for 1 to 10 min, and further heated at from 100 to 160° C. for 10 to 60 min to be hardened.

In addition, before coating the coating liquid including a charge transportable polymer combined with a metal alkoxide, an acidic catalyst is added thereto in small quantity to promote the hydrolysis reaction at from a room temperature to 100° C. for 0.5 to 24 hrs and the crosslinking reaction.

When the polymer for hybrid material is hydrolyzed and polycondensated, the photoreceptor has a surface layer having good mechanical strength such as abrasion resistance and damage resistance, heat resistance, hardness, environment resistance, chemical resistance and contamination resistance. The surface layer has different thickness in accordance with a layer structure of the photoreceptor as mentioned later.

Hereinafter, the layer structure of the electrophotographic photoreceptor of the present invention will be explained, referring to the drawings.

Figure 1B:
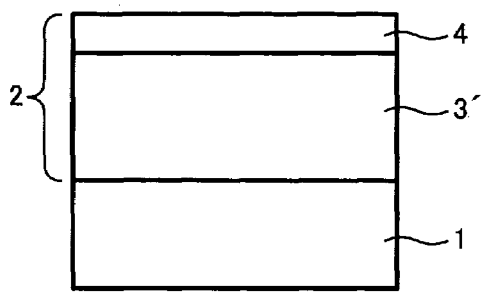

FIGS. 1A and 1B are cross-sectional views of embodiments of coated layers of the electrophotographic photoreceptor of the present invention.

In FIGS. 1A and 1B, a single-layered photosensitive layer 2 having charge generatability and charge transportability is formed on an electroconductive substrate 1. Numerals 3 and 3' are layers having charge generatability and charge transportability.

In FIG. 1A, the photosensitive layer 2 is namely a surface layer including an organic-inorganic hybrid material, and in FIG. 1B, a surface layer including an organic-inorganic hybrid material 4 is a surface part of the photosensitive layer 2.

Figure 2A:
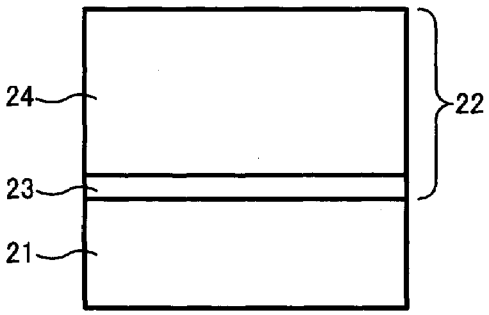
FIGS. 2A and 2B are cross-sectional views of other embodiments of layers of the electrophotographic photoreceptor of the present invention.
Figure 2B:
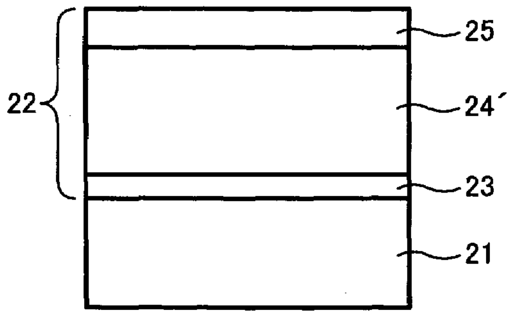

FIGS. 2A and 2B are cross-sectional views of other embodiments of layers of the electrophotographic photoreceptor of the present invention.

In FIGS. 2A and 2B, a multilayered photosensitive layer 22 including a charge generatable charge generation layer 23 and a charge transportable charge transport layer 24 or 24' is formed on an electroconductive substrate 21.

In FIG. 2A, the charge transport layer 24 is namely a surface layer including an organic-inorganic hybrid material, and in FIG. 2B, a surface layer including an organic-inorganic hybrid material 25 is a surface part of the photosensitive layer 22.

Suitable materials for use as the electroconductive substrate of the electrophotographic photoreceptor of the present invention include materials having a volume resistance not greater than $10^{10}$ Ω·cm. Specific examples of such materials include plastic cylinders, plastic films or paper sheets, on the surface of which a metal such as aluminum, nickel, chromium, nichrome, copper, gold, silver, platinum and the like, or a metal oxide such as tin oxides, indium oxides and the like, is deposited or sputtered. In addition, a plate of a metal such as aluminum, aluminum alloys, nickel and stainless steel and a metal cylinder, which is prepared by tubing a metal such as the metals mentioned above by a method such as impact ironing or direct ironing, and then treating the surface of the tube by cutting, super finishing, polishing and the like treatments, can also be used as the substrate. Further, endless belts of a metal such as nickel and stainless steel, which have been disclosed in Japanese Laid-Open Patent Publication No. 52-36016, can also be used as the substrate.

Furthermore, substrates, in which a coating liquid including a binder resin and an electroconductive powder is coated on the supporters mentioned above, can be used as the substrate.

Specific examples of such an electroconductive powder include carbon black, acetylene black, powders of metals such as aluminum, nickel, iron, Nichrome, copper, zinc, silver, etc., and metal oxides such as electroconductive tin oxides, ITO, etc.

Specific examples of the binder resin include known thermoplastic resins, thermosetting resins and photo-crosslinking resins, such as polystyrene, styrene-acrylonitrile copolymers, styrene-butadiene copolymers, styrene-maleic anhydride copolymers, polyesters, polyvinyl chloride, vinyl chloride-vinyl acetate copolymers, polyvinyl acetate, polyvinylidene chloride, polyarylates, phenoxy resins, polycarbonates, cellulose acetate resins, ethyl cellulose resins, polyvinyl butyral resins, polyvinyl formal resins, polyvinyl toluene, poly-N-vinyl carbazole, acrylic resins, siliconeresins, epoxy resins, melamine resins, urethane resins, phenolic resins, alkyd resins and the like resins.

Such an electroconductive layer can be formed by coating a coating liquid in which an electroconductive powder and a binder resin are dispersed in a solvent such as tetrahydrofuran, dichloromethane, methyl ethyl ketone, toluene and the like solvent, and then drying the coated liquid.

Further, substrates, in which an electroconductive resin film is formed on a surface of a cylindrical substrate using a heat-shrinkable resin tube made of a combination of a resin such as polyvinyl chloride, polypropylene, polyesters, polyvinylidene chloride, polyethylene, chlorinated rubber and fluorine-containing resins, with an electroconductive material, can also be preferably used as the substrate.

Next, the photosensitive layer will be explained. The photosensitive layer may be single-layered or multilayered. The multilayered photosensitive layer is formed of, as shown in FIGS. 2A and 2B, charge generatable charge generation layer and a charge transportable charge transport layer. The single-layered photosensitive layer is as shown in FIGS. 1A and 1B, a layer having both the charge generation function and charge transport function. Hereinafter, the multilayered photosensitive layer and single-layered photosensitive layer will be explained respectively.

The charge transport layer (CGL) is mainly formed of a charge generation material, and optionally includes a binder resin. Suitable charge generation materials include inorganic materials and organic materials.

Specific examples of the inorganic charge generation materials include crystalline selenium, amorphous selenium, selenium-tellurium alloys, selenium-tellurium-halogen alloys, selenium-arsenic alloys, amorphous silicon, etc. The amorphous silicon includes a dangling bond terminated with a hydrogen atom or a halogen atom, a doped boron atom, a doped phosphorus atom, etc.

Specific examples of the organic charge generation materials include known materials, for example, phthalocyanine pigments such as metal phthalocyanine and metal-free phthalocyanine, azulenium pigments, squaric acid methine pigments, azo pigments having a carbazole skeleton, azo pigments having a triphenylamine skeleton, azo pigments having a diphenylamine skeleton, azo pigments having a dibenzothiophene skeleton, azo pigments having a fluorenone skeleton, azo pigments having an oxadiazole skeleton, azo pigments having a bisstilbene skeleton, azo pigments having a distyryloxadiazole skeleton, azo pigments having a distyrylcarbazole skeleton, perylene pigments, anthraquinone pigments, polycyclic quinone pigments, quinoneimine pigments, diphenyl methane pigments, triphenyl methane pigments, benzoquinone pigments, naphthoquinone pigments, cyanine pigments, azomethine pigments, indigoid pigments, bisbenzimidazole pigments and the like materials. These charge transport materials can be used alone or in combination.

Specific examples of the binder resin optionally used in the CGL include polyamide resins, polyurethane resins, epoxy resins, polyketone resins, polycarbonate resins, silicone resins, acrylic resins, polyvinyl butyral resins, polyvinyl formal resins, polyvinyl ketone resins, polystyrene resins, poly-N-vinylcarbazole resins, polyacrylamide resins, and the like resins. These resins can be used alone or in combination.

In addition, a charge transport polymer material can also be used as the binder resin in the CGL besides the above-mentioned binder resins. Specific examples thereof include polymer materials such as polycarbonate resins, polyester resins, polyurethane resins, polyether resins, polysiloxane resins and acrylic resins having an arylamine skeleton, a benzidine skeleton, a hydrazone skeleton, a carbazole skeleton, a stilbene skeleton, a pyrazoline skeleton, etc.; and polymer materials having polysilane skeleton.

Specific examples of the former polymer materials include charge transport polymer materials disclosed in Japanese Laid-Open Patent Publications Nos. 01-001728, 01-009964, 01-013061, 01-019049, 01-241559, 04-011627, 04-175337, 04-183719, 04-225014, 04-230767, 04-320420, 05-232727, 05-310904, 06-234838, 06-234839, 06-234840, 06-234839, 06-234840, 06-234841, 06-236051, 06-295077, 07-056374, 08-176293, 08-208820, 08-211640, 08-253568, 08-269183, 09-062019, 09-043883, 09-71642, 09-87376, 09-104746, 09-110974, 09-110976, 09-157378, 09-221544, 09-227669, 09-235367, 09-241369, 09-268226, 09-272735, 09-302084, 09-302085, 09-328539, etc.

Specific examples of the latter polymer materials include polysilylene polymers disclosed in Japanese Laid-Open Patent Publications Nos. 63-285552, 05-19497, 05-70595, 10-73944, etc.

The CGL also can include a low-molecular-weight charge transport material. The low-molecular-weight charge transport materials include positive hole transport materials and electron transport materials.

Specific examples of the electron transport materials include electron accepting materials such as chloranil, bromanil, tetracyanoethylene, tetracyanoquinodimethane, 2,4,7-trinitro-9-fluorenone, 2,4,5,7-tetranitro-9-fluorenone, 2,4,5,7-tetranitro-xanthone, 2,4,8-trinitrothioxanthone, 2,6,8-trinitro-4H-indeno[1,2-b]thiophene-4-one, 1,3,7-trinitrobenzothiophene-5,5-dioxide, diphenoquinone derivatives, etc. These electron transport materials can be used alone or in combination.

Specific examples of the positive hole transport materials include electron donating materials such as oxazole derivatives, oxadiazole derivatives, imidazole derivatives, monoarylamines derivatives, diarylaminederivatives, triarylaminederivatives, stilbene derivatives, α-phenylstilbene derivatives, benzidine derivatives, diarylmethane derivatives, triarylmethane derivatives, 9-styrylanthracene derivatives, pyrazoline derivatives, divinylbenzenederivatives, hydrazonederivatives, indene derivatives, butadiene derivatives, pyrene derivatives, bisstilbene derivatives, enamine derivatives, and other known materials. These positive hole transport materials can be used alone or in combination.

Suitable methods for forming the charge generation layer are broadly classified into a vacuum thin film forming method and a solvent dispersion casting method.

Specific examples of the former vacuum thin film forming method include a vacuum evaporation method, a glow discharge decomposition method, an ion plating method, a sputtering method, a reaction sputtering method, CVD (chemical vapor deposition) methods, etc. A layer of the above-mentioned inorganic and organic materials can be formed by these methods.

The casting method for forming the charge generation layer typically includes the following steps:

(1) preparing a coating liquid by mixing one or more inorganic or organic charge generation materials mentioned above with a solvent such as tetrahydrofuran, dioxane, dioxolan, toluene, dichloromethane, monochlorobenzene, dichloroethane, cyclohexanone, cyclopentanone, anisole, xylene, methyl ethyl ketone, acetone, ethyl acetate, butyl acetate, etc., optionally with a binder resin and a leveling agent such as a dimethylsilicone oil and methylphenyl silicone oil, and then dispersing the materials with a ball mill, an attritor, a sandmill, beadsmill, etc. to prepare a CGL coating liquid;

(2) coating the CGL coating liquid, which is diluted if necessary, on a substrate by a method such as dip coating, spray coating, bead coating and ring coating; and (3) drying the coated liquid to form a CGL.

The thickness of the CGL is preferably from about 0.01 to about 5 μm, and more preferably from about 0.05 to about 2 μm.

The charge transport layer (CTL) is a layer having a charge transportability, and the surface layer including the organic-inorganic hybrid material including a charge transportable constituent of the present invention is effectively used as a CTL.

When the charge transport layer 24 is namely a surface layer including an organic-inorganic hybrid material, the coating liquid including the polymer for hybrid material having a metal alkoxide group combined with an organic polymer of the present invention is coated on the CGL, optionally dried, and subjected to a sol-gel reaction (crosslinking reaction) by heating to form a surface layer including organic-inorganic hybrid material.

The surface layer preferably has a thickness of from 10 to 30 μm, and more preferably from 10 to 25 μm. When thinner than 10 μm, a sufficient charged potential cannot be maintained. When thicker than 30 μm, a contraction in volume thereof when hardened tends to cause a separation thereof from a lower layer.

When the surface layer including an organic-inorganic hybrid material is a surface part of the multilayered photosensitive layer, a charge transportable charge transport material and a binder resin are dissolved or dispersed in a suitable solvent to prepare a coating liquid, the coating liquid is coated and dried on the CGL to form a CTL thereon; and the coating liquid including the polymer for hybrid material having a metal alkoxide group combined with an organic polymer of the present invention is coated thereon, optionally dried, and subjected to a sol-gel reaction (crosslinking reaction) by heating to form a surface layer including organic-inorganic hybrid material thereon.

Specific examples of the charge transport materials for use in the CTL include electron transport materials, positive hole transport materials and charge transport polymer materials used in the CGL. Particularly, the charge transport polymer materials are effectively used to reduce solution of the CTL when a surface layer is coated thereon.

Specific examples of the binder resins include thermoplastic or thermosetting resins such as polystyrene, styrene-acrylonitrile copolymers, styrene-butadiene copolymers, styrene-maleic anhydride copolymers, polyester, polyvinylchloride, vinylchloride-vinylacetate copolymers, polyvinylacetate, polyvinylidenechloride, polyarylate resins, phenoxy resins, polycarbonate, cellulose acetate resins, ethylcellulose resins, polyvinylbutyral, polyvinylformal, polyvinyltoluene, poly-N-vinylcarbazole, acrylic resins, silicone resins, epoxyresins, melamine resins, urethane resins, phenol resins and alkyd resins.

The CTL preferably includes a charge transport material inan amount of from 20 to 300 parts by weight, and more preferably from 40 to 150 parts by weight per 100 parts by weight of the binder resin. However, the charge transport polymer material can be used alone or in combination with the binder resin.

Specific examples of solvents used for coating the CTL include the solvents used for coating the CGL, and particularly the solvents solving the charge transport material and binder resin well are preferably used. These solvents can be used alone or in combination. The CTL can be formed by the same coating methods used for coating the CGL. In addition, the CTL may optionally include a plasticizer and a leveling agent.

Specific examples of the plasticizers for use in the CTL include plasticizers for typical resins, such as dibutylphthalate and dioctylphthalate, and a content thereof is preferably from 0 to 30 parts by weight per 100 parts by weight of the binder resin.

Specific examples of the leveling agents for use in the CTL include silicone oil such as dimethyl silicone oil and methylphenyl silicone oil; and polymers or oligomers having a perfluoroalkyl group in the side chain, and a content thereof is preferably from 0 to 1 part by weight per 100 parts by weight of the binder resin.

The CTL preferably has a thickness of from 5 to 40 μm, and more preferably from 10 to 30 μm.

The surface layer including organic-inorganic hybrid material on the CTL preferably has a thickness of from 1 to 20 μm, and more preferably from 2 to 10 μm. When thinner than 1 μm, uneven thickness thereof causes uneven durability thereof. When thicker than 20 μm, a total thickness of the CTL and crosslinked surface layer is so thick that charges are scattered, resulting in deterioration of image reproducibility of the resultant photoreceptor.

The single-layered photosensitive layer has both charge generatability and charge transportability, and the organic-inorganic hybrid material including a charge transportable constituent of the present invention is effectively used as a single-layered photosensitive layer.

As mentioned in the casting method of forming the CGL, a coating liquid including a charge generation material and the polymer for hybrid material having a metal alkoxide group combined with an organic polymer of the present invention is coated on an electroconductive substrate, optionally dried, and heated to form a layer including an organic-inorganic hybrid material. The charge generation material may previously be dispersed in a solvent to prepare a dispersion, and the dispersion may be added into the coating liquid. The surface layer preferably has a thickness of from 10 to 30 μm, and more preferably from 10 to 25 μm. When thinner than 10 μm, a sufficient charged potential cannot be maintained. When thicker than 30 μm, a contraction in volume thereof when hardened tends to cause a separation thereof from an undercoat layer.

When the surface layer including the organic-inorganic hybrid material overlies a single-layered photosensitive layer, the photosensitive layer can be formed by coating and drying a liquid wherein a charge generation material having a charge generation function, a charge transport material having a charge transport function and a binder resin are dispersed or dissolved in a proper solvent. The photosensitive layer may optionally includes an additive such as plasticizers and leveling agents. The methods of dispersing a charge generation material, charge generation materials, charge transport materials, plasticizers and leveling agents mentioned in the above CGL and CTL can be used.

Besides the binder resins mentioned in the above CTL, the binder resins in the above CGL can be mixed therewith. In addition, the above-mentioned charge transport polymer material can effectively be used to prevent components of the CTL from mixing in the surface layer. The CTL of the photosensitive layer preferably has a thickness of from 5 to 30 μm, and more preferably from 10 to 25 μm.

The single-layered photosensitive layer preferably includes a charge generation material in an amount of from 1 to 30% by weight, a binder resin of from 20 to 80% by weight and a charge transport material of from 10 to 70 parts by weight based on total weight thereof.

The electrophotographic photoreceptor of the present invention can have an intermediate layer between the surface layer including the organic-inorganic hybrid material and the CTL when the surface layer overlies the photosensitive layer. The intermediate layer prevents components of the CTL from mixing in the surface layer to avoid inhibition of hardening reaction and concavities and convexities thereof. In addition, the intermediate layer can improve adhesiveness between the surface layer and the CTL.

The intermediate layer includes a resin as a main component. Specific examples of the resin include polyamides, alcohol-soluble nylons, water-soluble polyvinyl butyral, polyvinyl butyral, polyvinyl alcohol, etc. The intermediate layer can be formed by one of the above-mentioned known coating methods. The intermediate layer preferably has a thickness of from 0.05 to 2 μm.

The electrophotographic photoreceptor of the present invention may have an undercoat between the substrate and photosensitive layer. The undercoat layer includes a resin as a main component. Since a photosensitive layer is typically formed on the undercoat layer by coating a liquid including an organic solvent, the resin in the undercoat layer preferably has good resistance to typical organic solvents.

Specific examples of such resins include water-soluble resins such as a polyvinyl alcohol resin, casein and a polyacrylic acid sodium salt; alcohol-soluble resins such as a nylon copolymer and a methoxymethylated nylon resin; and thermosetting resins capable of forming a three-dimensional network such as a polyurethane resin, a melamine resin, an alkyd-melamine resin, an epoxy resin, etc.

In addition, the undercoat layer may include a fine powder of metal oxides such as titanium oxide, silica, alumina, zirconium oxide, tin oxide and indiumoxide to prevent occurrence of moiré in the recorded images and to decrease residual potential of the photoreceptor.

The undercoat layer can also be formed by coating a coating liquid using a proper solvent and a proper coating method similarly to those for use in formation of the photosensitive layer mentioned above. The undercoat layer may be formed using a silane coupling agent, titanium coupling agent or a chromium coupling agent. In addition, a layer of aluminum oxide which is formed by an anodic oxidation method and a layer of an organic compound such as polyparaxylylene (parylene) or an inorganic compound such as SiO, $SnO_2$, $TiO_2$, ITO or $CeO_2$ which is formed by a vacuum evaporation method is also preferably used as the undercoat layer. Besides these materials, known materials can be used. The thickness of the undercoat layer is preferably from 0 to 5 μm.

In the present invention, an antioxidant can be included in each of the layers, i.e., the crosslinked surface layer, charge generation layer, charge transport layer, undercoat layer and intermediate layer to improve the stability to withstand environmental conditions, namely to avoid decrease of photosensitivity and increase of residual potential.

Specific examples of the antioxidant for use in the present invention include the following compounds.

(a) Phenolic Compounds 2,6-di-t-butyl-p-cresol, butylated hydroxyanisole, 2,6-di-t-butyl-4-ethylphenol, n-octadecyl-3-(4'-hydroxy-3',5'-di-t-butylphenol), 2,2'-methylene-bis-(4-methyl-6-t-butylphenol), 2,2'-methylene-bis-(4-ethyl-6-t-butylphenol), 4,4'-thiobis-(3-methyl-6-t-butylphenol), 4,4'-butylidenebis-(3-methyl-6-t-butylphenol), 1,1,3-tris-(2-methyl-4-hydroxy-5-t-butylphenyl)butane, 1,3,5-trimethyl-2,4,6-tris(3,5-di-t-butyl-4-hydroxybenzyl)benzene, tetrakis-[methylene-3-(3',5'-di-t-butyl-4'-hydroxyphenyl)propionate]methane, bis[3,3'-bis(4'-hydroxy-3'-t-butylphenyl)butyric acid]glycol ester, tocophenol compounds, etc.

(b) Paraphenylenediamine Compounds

N-phenyl-N'-isopropyl-p-phenylenediamine, N,N'-di-sec-butyl-p-phenylenediamine, N-phenyl-N-sec-butyl-p-phenylenediamine, N,N'-di-isopropyl-p-phenylenediamine, N,N'-dimethyl-N,N'-di-t-butyl-p-phenylenediamine, etc.

(c) Hydroquinone Compounds 2,5-di-t-octylhydroquinone, 2,6-didodecylhydroquinone, 2-dodecylhydroquinone, 2-dodecyl-5-chlorohydroquinone, 2-t-octyl-5-methylhydroquinone, 2-(2-octadecenyl)-5-methylhydroquinone, etc.

(d) Organic Sulfur-Containing Compounds

Dilauryl-3,3'-thiodipropionate, distearyl-3,3'-thiodipropionate, ditetradecyl-3,3'-thiodipropionate, etc.

(e) Organic Phosphorus-Containing Compounds

Triphenylphosphine, tri(nonylphenyl)phosphine, tri(dinonylphenyl)phosphine, tricresylphosphine, tri(2,4-dibutylphenoxy)phosphine, etc.

These compounds are known as antioxidants for rubbers, plastics, fats, etc., and marketed products thereof can easily be obtained.

Each of the layers preferably includes the antioxidant in an amount of from 0.01 to 10% by weight based on total weight thereof.

Next, the image forming method and image forming apparatus of the present invention will be explained.

The image forming apparatus of the present invention includes a photoreceptor of the present invention, a charger, an imagewise light irradiator, an image developer, a transferer transferring a toner image, a fixer, a cleaner cleaning the surface of the photoreceptor, etc., wherein the photoreceptor is charged and irradiated with an imagewise light to form an electrostatic latent image thereon; the electrostatic latent image is developed to form a toner image; the toner image is transferred onto an image bearer (transfer sheet) and fixed thereon; and a surface of the photoreceptor is cleaned. The process is not limited thereto in such a method as to directly transfer an electrostatic latent image onto a transfer sheet and develop the electrostatic latent image thereon. Hereinafter, the image forming apparatus and image forming method of the present invention will be explained in detail, referring to the drawings.

Figure 3:
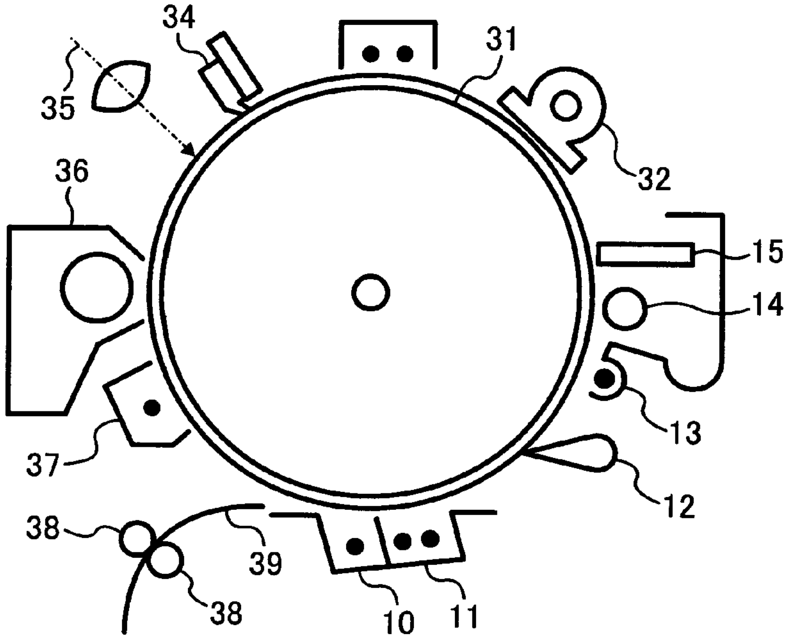
FIG. 3 is a schematic view illustrating a partial cross-section of an embodiment of the image forming apparatus of the present invention.

FIG. 3 is a schematic view illustrating a partial cross-section of an embodiment of the image forming apparatus of the present invention. In FIG. 3, a charger 33 is used to uniformly charge a photoreceptor 31. Specific examples of the charger include known chargers such as corotron devices, scorotron device, solid state chargers, needle electrode devices, roller charging devices and electroconductive brush devices.

Next, an imagewise irradiator 35 is used to form an electrostatic latent image on the uniformly-charged photoreceptor 31. Suitable light sources thereof include typical light emitters such as fluorescent lamps, tungsten lamps, halogen lamps, mercury lamps, sodium lamps, light emitting diodes (LEDs), laser diodes (LDs), light sources using electroluminescence (EL), etc. In addition, to obtain light having a desired wave length range, filters such as sharp-cut filters, band pass filters, near-infrared cutting filters, dichroic filters, interference filters and color temperature converting filters can be used.

A developing unit 36 is used to visualize an electrostatic latent image formed on the photoreceptor 31. The developing methods include a one-component developing method and a two-component developing method using a dry toner; and a wet developing method using a wet toner. When the photoreceptor positively or negatively charged is exposed to imagewise light, an electrostatic latent image having a positive or negative charge is formed on the photoreceptor. When the latent image having a positive charge is developed with a toner having a negative charge, a positive image can be obtained. In contrast, when the latent image having a positive charge is developed with a toner having a positive charge, a negative image can be obtained.

Next, a transfer charger 10 is used to transfer a toner image visualized on the photoreceptor onto a transfer sheet 39. A pre-transfer charger 37 may be used to perform the transfer better. Suitable transferers include a transferer charger, an electrostatic transferer using a bias roller, an adhesion transferer, a mechanical transferer using a pressure and a magnetic transferer. The above-mentioned chargers can be used for the electrostatic transferer.

Next, a separation charger 11 and a separation pick 12 are used to separate the transfer sheet 39 from the photoreceptor 31. Other separation means include an electrostatic absorption induction separator, a side-edge belt separator, a tip grip conveyor, a curvature separator, etc. The above-mentioned chargers can be used for the separation charger 11.

Next, a fur brush 14 and a cleaning blade 15 are used to remove a toner left on the photoreceptor 31 after transferred therefrom. A pre-cleaning charger 13 may be used to perform the cleaning more effectively. Other cleaners include a web cleaner, a magnet brush cleaner, etc., and these cleaners can be used alone or in combination.

Next, a discharger is optionally used to remove a latent image in the photoreceptor 31. The discharger includes a discharge lamp 32 and a discharger, and the above-mentioned light sources and chargers can be used respectively.

Known means can be used for other an original reading process, a paper feeding process, a fixing process, a paper delivering process, etc., which are not close to the photoreceptor 31.

The image forming apparatus and image forming method using the electrophotographic photoreceptor of the present invention can produce high-quality images for long periods, and the apparatus can be downsized.

Figure 4:
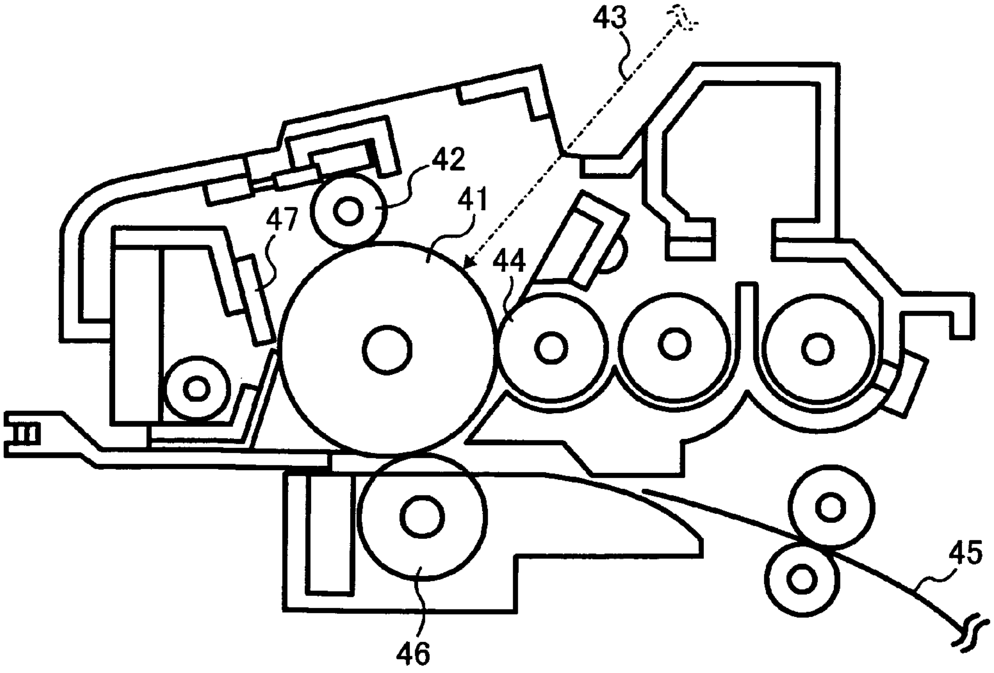
FIG. 4 is a schematic view illustrating a cross-section of an embodiment of the process cartridge detachable from an image forming apparatus of the present invention.

The above-mentioned image forming unit may be fixedly set in a copier, a facsimile or a printer. However, the image forming unit may be detachably set therein as a process cartridge. FIG. 4 is a schematic view illustrating a cross-section of an embodiment of the process cartridge for the image forming apparatus of the present invention.

The process cartridge is an image forming unit (or device) including a photoreceptor 41 and at least one of a charger 42, an image developer 44, a transferer 46, a cleaner 47 and a discharger (not shown).

While the photoreceptor 41 rotates in a direction indicated by an arrow, the photoreceptor is charged by the charger 42 and irradiated by an irradiator 43 to form an electrostatic latent image relevant to imagewise light thereon. The electrostatic latent image is developed by the image developer 44 with a toner to form a form a toner image, and the toner image is transferred by the transferer 46 onto a transfer sheet 45 to be printed out. Next, a surface of the photoreceptor after the toner image is transferred is cleaned by the cleaner 47, discharged by a discharger (not shown) and these processes are repeated again.

The process cartridge including the electrophotographic photoreceptor of the present invention, and at least one of a charger, an image developer, a transferer, a cleaner and a discharger can make the image forming apparatus compact and the maintenance thereof simple and steady. In addition, only an exchange thereof can restore the original high-quality images.

The process cartridge installed in an image forming apparatus, wherein at least charging, irradiating, developing and transfer processes are repeated, can stably produce high-quality images for long periods.

As is apparent from the explanations mentioned above, the electrophotographic photoreceptor of the present invention can widely be used in electrophotography applied fields such as a laser beam printer, a CRT printer, a LED printer, a liquid crystal printer and a laser engraving.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Charge transportable polymers having a hydroxyl group were synthesized in Preparation Examples 1 to 6, which were alkoxy-silylated to prepare polymers for hybrid materials (Examples 1 to 6). Photoreceptors using the polymers for hybrid materials were prepared in Examples 7 to 12, and properties thereof were compared with photoreceptors prepared in Comparative Examples 1 to 3.

Preparation Example 1

<Charge Transportable Polymer Having a Hydroxyl Group (Polymer No. 1)>

3.87 g of N-{4-[2,2-bis(4-hydroxyphenyl)vinyl]phenyl}-N,N-bis(4-tolyl )amine (0.008 mol), 2.74 g of 2,2-bis(4-hydroxyphenyl)propane (0.012 mol), 2.5 ml of dehydrated pyridine and 40 ml of dehydrated dichloromethane were put in a four-opening flask having a mixer, a thermometer and a dropping funnel, and stirred under nitrogen stream to be dissolved. The resultant solution was bathed in water to keep the inner temperature thereof at 3° C., and a liquid wherein 1.48 g of bis(trichloromethane)carbonate (5.0 millimol), i.e., a trimer of phosgene, were dissolved in 20 ml of dehydrated dichloromethane, was dropped therein in 20 min while strongly stirred. Then, the inner temperature was kept at 4° C. and the reaction therein was performed for 3 hrs. The resultant solution was washed with a hydrochloric acid aqueous solution having a concentration of 2%, and with ion-exchanged water. The resultant solution was dropped in 1.5 l of methanol and a yellow product was separated out therein, and the yellow product was dried to prepare a charge transportable polymer having a hydroxyl group (Polymer No. 1).

Figure 5:
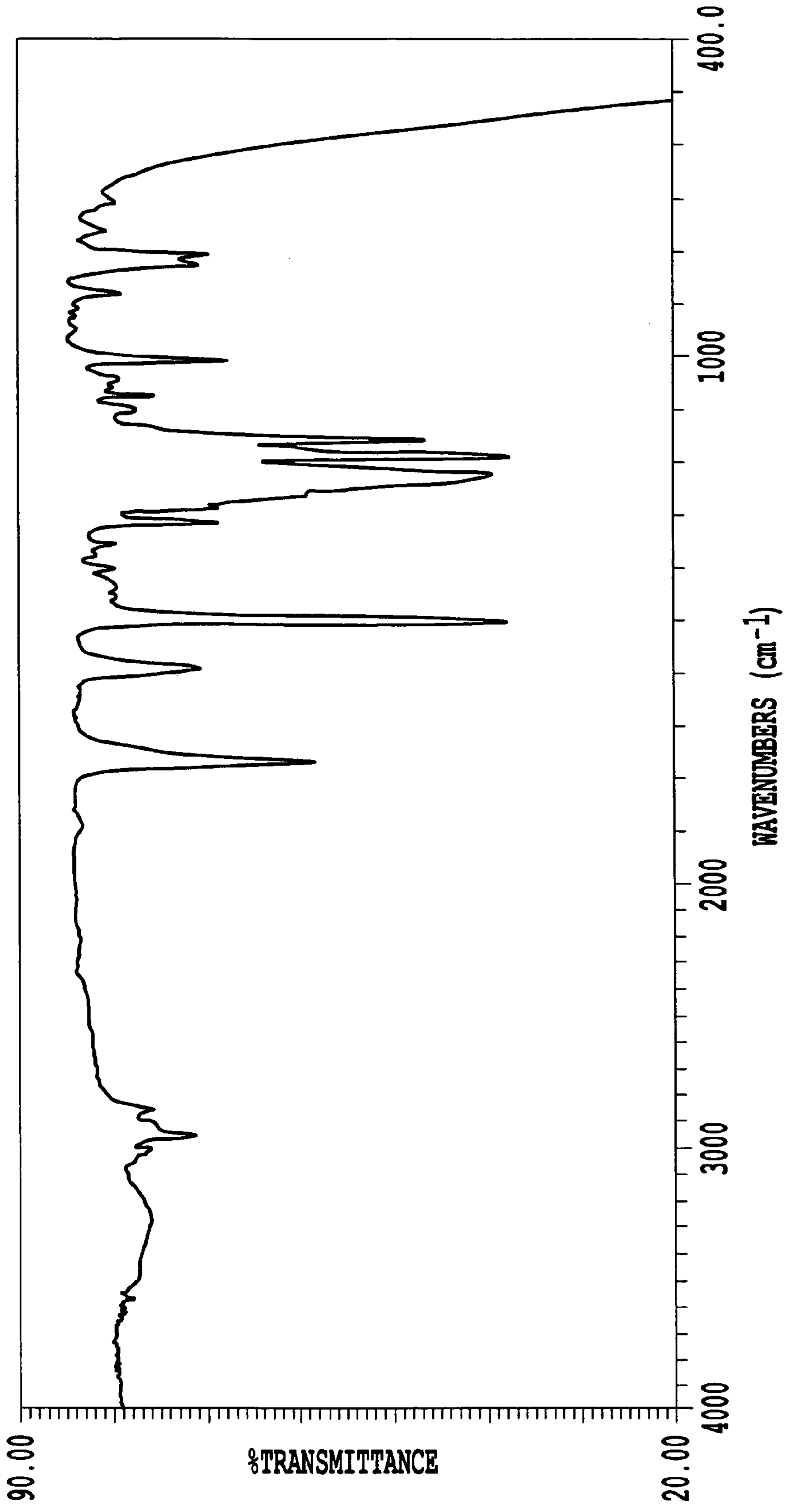
FIG. 5 is an infrared absorption spectrum of the Polymer No. 1 in Preparation Example 1.

The molecular weight of the Polymer No. 1 was measured by the gel permeation chromatography (GPC) method to find that a polystyrene-equivalent number-average molecular weight thereof was 2,200. In addition, the infrared absorption spectrum thereof is shown in FIG. 5. The constitutional unit and elemental analysis thereof are shown in Table 1.

Preparation Example 2

<Charge Transportable Polymer Having a Hydroxyl Group (Polymer No. 2)>

3.87 g of N-{4-[2,2-bis(4-hydroxyphenyl)vinyl]phenyl}-N,N-bis(4-tolyl)amine (0.008 mol), 2.74 g of 2,2-bis(4-hydroxyphenyl)propane (0.012 mol), 2.5 ml of dehydrated pyridine and 40 ml of dehydrated dichloromethane were put in a four-opening flask having a mixer, a thermometer and a dropping funnel, and stirred under nitrogen stream to be dissolved. The resultant solution was bathed in water to keep the inner temperature thereof at 3° C., and a liquid wherein 1.78g of bis(trichloromethane)carbonate (6.0 millimol), i.e., a trimer of phosgene, were dissolved in 20 ml of dehydrated dichloromethane, was dropped therein in 20 min while strongly stirred. Then, the inner temperature was kept at 4° C. and the reaction therein was performed for 3 hrs. The resultant solution was washed with a hydrochloric acid aqueous solution having a concentration of 2%, and with ion-exchanged water. The resultant solution was dropped in 1.5 l of methanol and a yellow product was separated out therein, and the yellow product was dried to prepare a charge transportable polymer having a hydroxyl group (Polymer No. 2).

The molecular weight of the Polymer No. 2 was measured by the gel permeation chromatography (GPC) method to find that a polystyrene-equivalent number-average molecular weight thereof was 3,400. The constitutional unit and elemental analysis thereof are shown in Table 1.

Preparation Example 3

<Charge Transportable Polymer Having a Hydroxyl Group (Polymer No. 3)>

9.96 g of N-{4-[2,2-bis(4-hydroxyphenyl)vinyl]phenyl}-N,N-bis(4-tolyl)amine (0.02 mol), 2.5 ml of dehydrated pyridine and 40 ml of dehydrated dichloromethane were put in a four-opening flask having a mixer, a thermometer and a dropping funnel, and stirred under nitrogen stream to be dissolved. The resultant solution was bathed in water to keep the inner temperature thereof at 3° C., and a liquid wherein 1.48 g of bis(trichloromethane)carbonate (5.0 millimol), i.e., a trimer of phosgene, were dissolved in 20 ml of dehydrated dichloromethane, was dropped therein in 20 min while strongly stirred. Then, the inner temperature was kept at 4° C. and the reaction therein was performed for 3 hrs. The resultant solution was washed with a hydrochloric acid aqueous solution having a concentration of 2%, and with ion-exchanged water. The resultant solution was dropped in 1.5 l of methanol and a yellow product was separated out therein, and the yellow product was dried to prepare a charge transportable polymer having a hydroxyl group (Polymer No. 3).

The molecular weight of the Polymer No. 3 was measured by the gel permeation chromatography (GPC) method to find that a polystyrene-equivalent number-average molecular weight thereof was 2,500. The constitutional unit and elemental analysis thereof are shown in Table 1.

Preparation Example 4

<Charge Transportable Polymer Having a Hydroxyl Group (Polymer No. 4)>

9.96 g of N-{4-[2,2-bis(4-hydroxyphenyl)vinyl]phenyl}-N,N-bis(4-tolyl)amine (0.02 mol), 2.5 ml of dehydrated pyridine and 40 ml of dehydrated dichloromethane were put in a four-opening flask having a mixer, a thermometer and a dropping funnel, and stirred under nitrogen stream to be dissolved. The resultant solution was bathed in water to keep the inner temperature thereof at 3° C., and a liquid wherein 1.78 g of bis(trichloromethane)carbonate (6.0 millimol), i.e., a trimer of phosgene, were dissolved in 20 ml of dehydrated dichloromethane, was dropped therein in 20 min while strongly stirred. Then, the inner temperature was kept at 4° C. and the reaction therein was performed for 3 hrs. The resultant solution was washed with a hydrochloric acid aqueous solution having a concentration of 2%, and with ion-exchanged water. The resultant solution was dropped in 1.5 l of methanol and a yellow product was separated out therein, and the yellow product was dried to prepare a charge transportable polymer having a hydroxyl group (Polymer No. 4).

The molecular weight of the Polymer No. 4 was measured by the gel permeation chromatography (GPC) method to find that a polystyrene-equivalent number-average molecular weight thereof was 4,500. The constitutional unit and elemental analysis thereof are shown in Table 1.

Preparation Example 5

<Charge Transportable Polymer Having a Hydroxyl Group (Polymer No. 5)>

12.08 g of N,N'-bis{3-methyl-4[2-(4-hydroxy)phenetyl] phenyl-4-methylbiphenyl-4'-amine disclosed in Japanese Laid-Open Patent Publication No. 2002-249472 (0.02 mol), 2.5 ml of dehydrated pyridine and 40 ml of dehydrated dichloromethane were put in a four-opening flask having a mixer, a thermometer and a dropping funnel, and stirred under nitrogen stream to be dissolved. The resultant solution was bathed in water to keep the inner temperature thereof at 3° C., and a liquid wherein 1.48 g of bis(trichloromethane)carbonate (5.0 millimol), i.e., a trimer of phosgene, were dissolved in 20 ml of dehydrated dichloromethane, was dropped therein in 20 min while strongly stirred. Then, the inner temperature was kept at 4° C. and the reaction therein was performed for 3 hrs. The resultant solution was washed with a hydrochloric acid aqueous solution having a concentration of 2%, and with ion-exchanged water. The resultant solution was dropped in 1.5 l of methanol and a yellow product was separated out therein, and the yellow product was dried to prepare a charge transportable polymer having a hydroxyl group (Polymer No. 5).

The molecular weight of the Polymer No. 5 was measured by the gel permeation chromatography (GPC) method to find that a polystyrene-equivalent number-average molecular weight thereof was 3,200. The constitutional unit and elemental analysis thereof are shown in Table 1.

Preparation Example 6

<Charge Transportable Polymer Having a Hydroxyl Group (Polymer No. 6)>

4.83 g of N,N'-bis{3-methyl-4[2-(4-hydroxy)phenetyl] phenyl-4-methylbiphenyl-4'-amine disclosed in Japanese Laid-Open Patent Publication No. 2002-249472 (0.008 mol), 3.22 g of 1,1-bis(4-hydroxyphenyl)cyclohexane (0.012 mol), 2.5 ml of dehydrated pyridine and 40 ml of dehydrated dichloromethane were put in a four-opening flask having a mixer, a thermometer and a dropping funnel, and stirred under nitrogen stream to be dissolved. The resultant solution was bathed in water to keep the inner temperature thereof at 3° C., and a liquid wherein 1.48 g of bis(trichloromethane)carbonate (5.0 millimol), i.e., a trimer of phosgene, were dissolved in 20 ml of dehydrated dichloromethane, was dropped therein in 20 min while strongly stirred. Then, the inner temperature was kept at 4° C. and the reaction therein was performed for 3 hrs. The resultant solution was washed with a hydrochloric acid aqueous solution having a concentration of 2%, and with ion-exchanged water. The resultant solution was dropped in 1.5 l of methanol and a yellow product was separated out therein, and the yellow product was dried to prepare a charge transportable polymer having a hydroxyl group (Polymer No. 6).

The molecular weight of the Polymer No. 5 was measured by the gel permeation chromatography (GPC) method to find that a polystyrene-equivalent number-average molecular weight thereof was 3,000. The constitutional unit and elemental analysis thereof are shown in Table 1.

TABLE 1

| Polymer No. | constitutional unit | Elemental analysis | C | H | N |
|---|---|---|---|---|---|
| 1 | 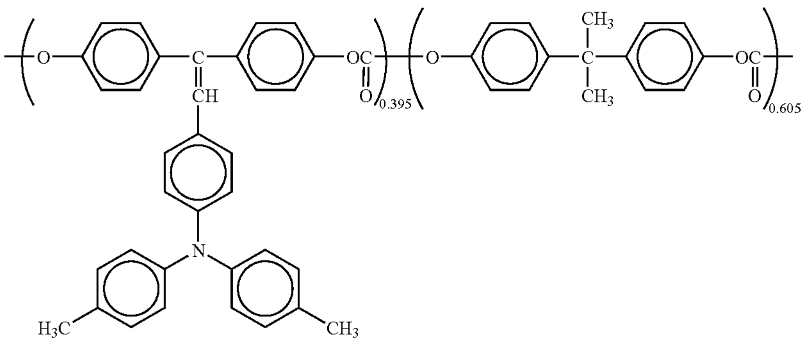 | Found value | 79.80 | 5.63 | 1.62 |
| | | Calculated value | 79.50 | 5.43 | 1.56 |

TABLE 1-continued
| Polymer No. | constitutional unit | Elemental analysis | C | H | N |
|---|---|---|---|---|---|
| 2 | 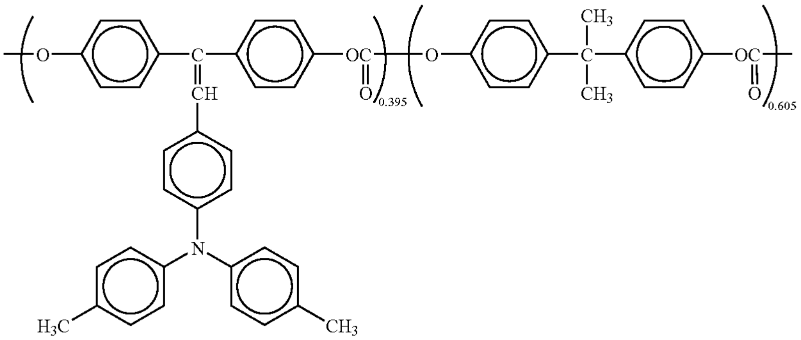 | Found value | 79.78 | 5.28 | 1.59 |
| | | Calculated value | 79.50 | 5.43 | 1.56 |
| 3 | 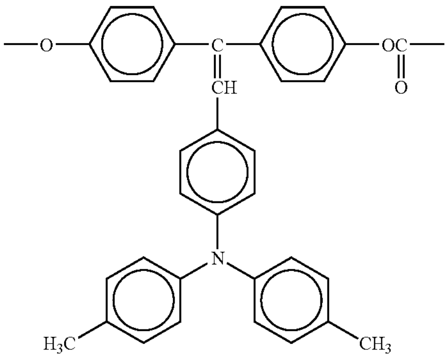 | Found value | 83.10 | 5.40 | 2.70 |
| | | Calculated value | 82.87 | 5.48 | 2.78 |
| 4 | 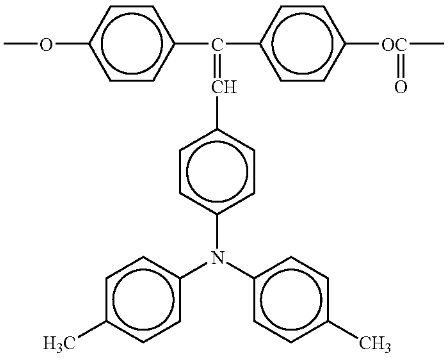 | Found value | 82.90 | 5.42 | 2.75 |
| | | Calculated value | 82.87 | 5.48 | 2.78 |

TABLE 1-continued

| Polymer No. | constitutional unit | Elemental analysis | C | H | N |
|---|---|---|---|---|---|
| 5 | 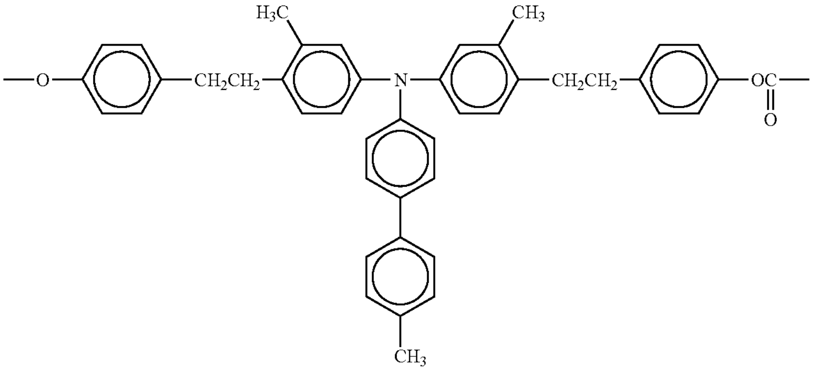 | Found value | 83.90 | 6.25 | 2.22 |
| | | Calculated value | 83.80 | 6.2 | 2.18 |
| 6 | 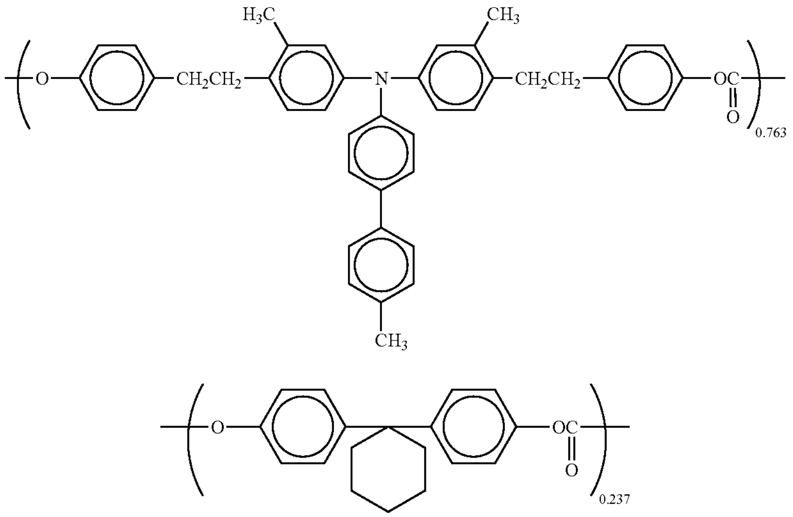 | Found value | 83.10 | 6.23 | 1.94 |
| | | Calculated value | 82.97 | 6.2 | 1.85 |

Example 1

<Alkoxy-Silylated Charge Transportable Polymer Having a Hydroxyl Group (Polymer No. 1 for Hybrid Material)>

3.5 g of the charge transportable polymer having a hydroxyl group No. 1 were dissolved in 25 ml of chloroform to prepare a solution. Next, 0.6 g of 3-isocyanatepropyltriethoxysilane (IPTES) were added thereto, and the solution was heated under reflux for 10 hrs and cooled to have a room temperature. The resultant liquid was dropped in methanol to separate out a reaction product. The reaction product was filtered, washed with methanol and dried under reduced pressure.

Figure 6:
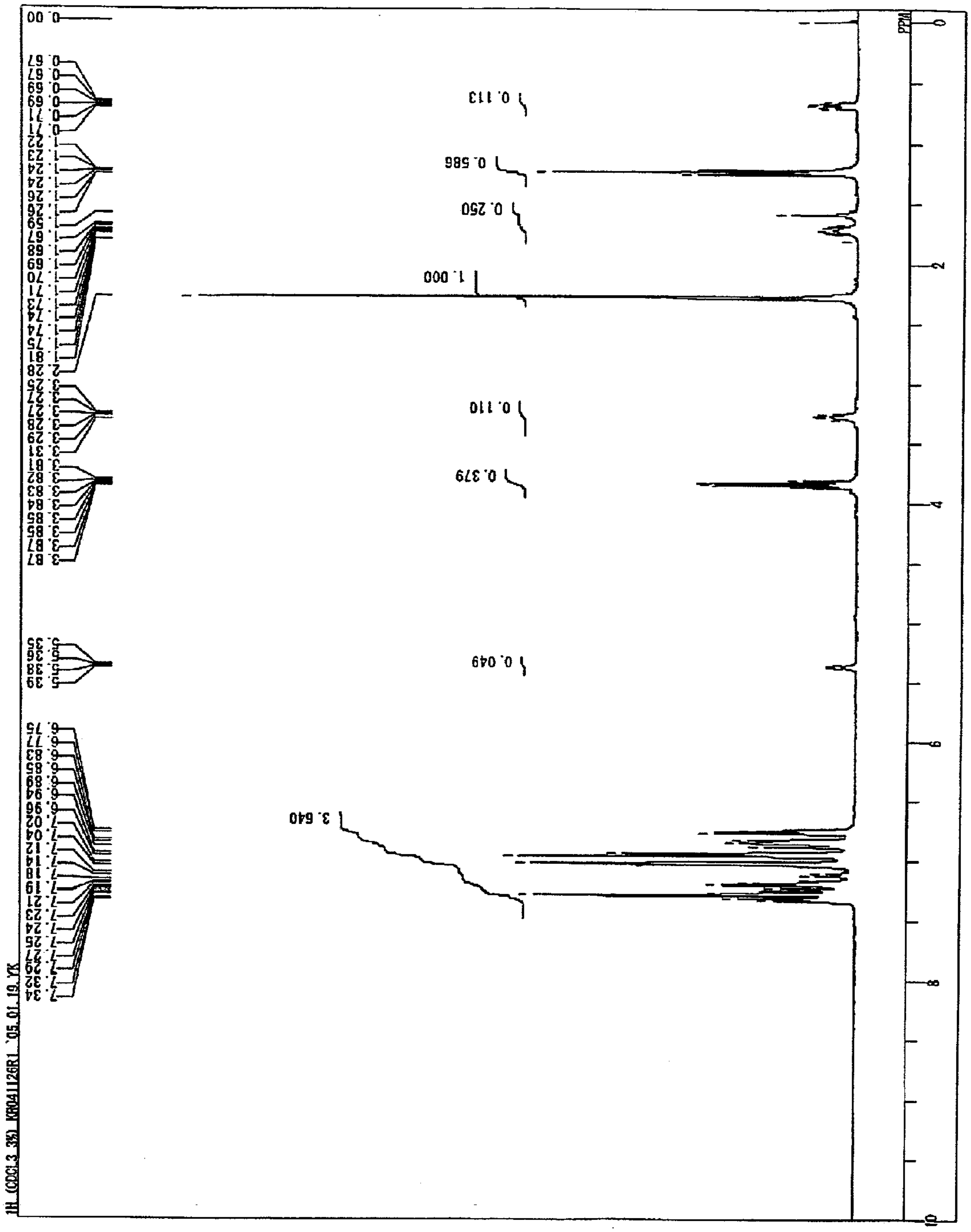
FIG. 6 is a 1H-NMR spectrum of the Polymer No. 1 for hybrid material in Example 1.

The 1H-NMR spectrum of the resultant product is shown in FIG. 6, which proved that the resultant product had alkoxysilyl groups at both ends. The molecular weight thereof was measured by the gel permeation chromatography (GPC) method to find that a number-average molecular weight thereof was 2,700.

Example 2

<Alkoxy-Silylated Charge Transportable Polymer Having a Hydroxyl Group (Polymer No. 2 for Hybrid Material)>

3.5 g of the charge transportable polymer having a hydroxyl group No. 2 were dissolved in 25 ml of chloroform to prepare a solution. Next, 0.5 g of 3-isocyanatepropyltriethoxysilane (IPTES) were added thereto, and the solution was heated under reflux for 10 hrs and cooled to have a room temperature. The resultant liquid was dropped in methanol to separate out a reaction product. The reaction product was filtered, washed with methanol and dried under reduced pressure.

The 1H-NMR spectrum of the resultant product proved that the resultant product had alkoxysilyl groups at both ends. The molecular weight thereof was measured by the gel permeation chromatography (GPC) method to find that a number-average molecular weight thereof was 4,000.

Example 3

<Alkoxy-Silylated Charge Transportable Polymer Having a Hydroxyl Group (Polymer No. 3 for Hybrid Material)>

3.5 g of the charge transportable polymer having a hydroxyl group No. 3 were dissolved in 25 ml of chloroform to prepare a solution. Next, 0.6 g of 3-isocyanatepropyltriethoxysilane (IPTES) were added thereto, and the solution was heated under reflux for 10 hrs and cooled to have a room temperature. The resultant liquid was dropped in methanol to separate out a reaction product. The reaction product was filtered, washed with methanol and dried under reduced pressure.

The 1H-NMR spectrum of the resultant product proved that the resultant product had alkoxysilyl groups at both ends. The molecular weight thereof was measured by the gel permeation chromatography (GPC) method to find that a number-average molecular weight thereof was 3,000.

Example 4

<Alkoxy-Silylated Charge Transportable Polymer Having a Hydroxyl Group (Polymer No. 4 for Hybrid Material)>

3.5 g of the charge transportable polymer having a hydroxyl group No. 4 were dissolved in 25 ml of chloroform to prepare a solution. Next, 0.5 g of 3-isocyanatepropyltriethoxysilane (IPTES) were added thereto, and the solution was heated under reflux for 10 hrs and cooled to have a room temperature. The resultant liquid was dropped in methanol to separate out a reaction product. The reaction product was filtered, washed with methanol and dried under reduced pressure.

The 1H-NMR spectrum of the resultant product proved that the resultant product had alkoxysilyl groups at both ends. The molecular weight thereof was measured by the gel permeation chromatography (GPC) method to find that a number-average molecular weight thereof was 5,100.

Example 5

<Alkoxy-Silylated Charge Transportable Polymer Having a Hydroxyl Group (Polymer No. 5 for Hybrid Material)>

3.5 g of the charge transportable polymer having a hydroxyl group No. 5 were dissolved in 25 ml of chloroform to prepare a solution. Next, 0.6 g of 3-isocyanatepropyltriethoxysilane (IPTES) were added thereto, and the solution was heated under reflux for 10 hrs and cooled to have a room temperature. The resultant liquid was dropped in methanol to separate out a reaction product. The reaction product was filtered, washed with methanol and dried under reduced pressure.

The 1H-NMR spectrum of the resultant product proved that the resultant product had alkoxysilyl groups at both ends. The molecular weight thereof was measured by the gel permeation chromatography (GPC) method to find that a number-average molecular weight thereof was 3,700.

Example 6

<Alkoxy-Silylated Charge Transportable Polymer Having a Hydroxyl Group (Polymer No. 6 for Hybrid Material)>

3.5 g of the charge transportable polymer having a hydroxyl group No. 6 were dissolved in 25 ml of chloroform to prepare a solution. Next, 0.5 g of 3-isocyanatepropyltriethoxysilane (IPTES) were added thereto, and the solution was heated under reflux for 10 hrs and cooled to have a room temperature. The resultant liquid was dropped in methanol to separate out a reaction product. The reaction product was filtered, washed with methanol and dried under reduced pressure.

The 1H-NMR spectrum of the resultant product proved that the resultant product had alkoxysilyl groups at both ends. The molecular weight thereof was measured by the gel permeation chromatography (GPC) method to find that a number-average molecular weight thereof was 3,500.

Example 7

An undercoat coating liquid having the following formulation was dip-coated on an aluminum cylinder having a diameter of 30 mm to form an undercoat layer 3.5 μm thick thereon after dried.

| Undercoat layer coating liquid | |
|---|---|
| Alkyd resin (BEKKOZOL 1307-60-EL from Dainippon Ink & Chemicals, Inc.) | 6 |
| Melamine resin (SUPER BEKKAMIN G-821-60 from Dainippon Ink & Chemicals, Inc.) | 4 |
| Titanium dioxide powder | 40 |
| Methyl ethyl ketone | 50 |

Next, a CGL coating liquid having the following formulation was dip-coated, heated and dried on the undercoat layer to form a CGL 0.2 μm thick thereon.

| CGL coating liquid | |
|---|---|
| Polyvinyl butyral (XYHL from Union Carbide Corp.) | 0.5 |
| Bisazo pigment having the following formula: | 2.5 |
| 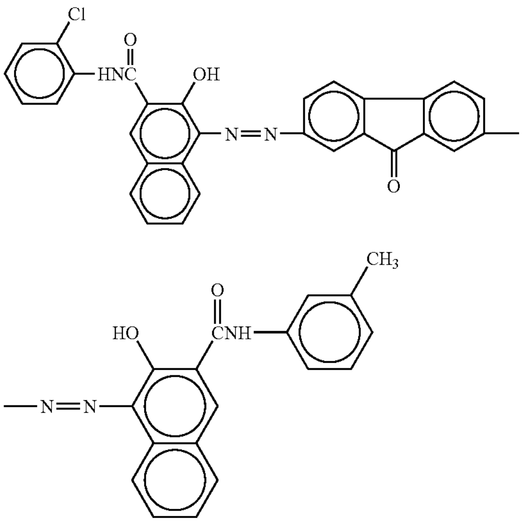 | |
| Cyclohexanone | 200 |
| Methyl ethyl ketone | 80 |

Further, a CTL coating liquid having the following formulation was dip-coated, heated and dried on the CGL to form a CTL 22 μm thick thereon.

| CTL coating liquid | |
|---|---|
| Bisphenol Z Polycarbonate (Panlite TS-2050 from TEIJIN CHEMICALS LTD.) | 10 |
| Charge transport material having the following formula: 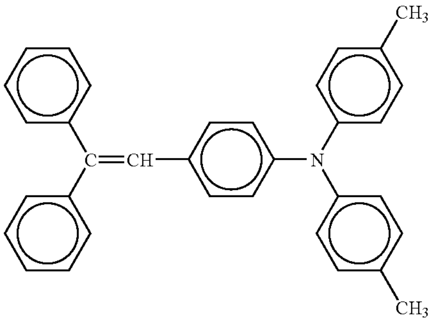 | 10 |
| Tetrahydrofuran | 80 |
| 1% tetrahydrofuran solution of silicone oil (KF50-100CS from Shin-Etsu Chemical Industry Co., Ltd.) | 0.2 |

Further, an organic-inorganic hybrid surface layer coating liquid having the following formulation was spray-coated and heated at 130° C. for 30 min on the CTL and a crosslinked surface layer 4.0 μm thick was formed thereon to prepare an electrophotographic photoreceptor.

Organic-inorganic Hybrid Surface Layer Coating Liquid 2.0 parts of the alkoxy-silylated charge transportable polymer (Polymer No. 1 for hybrid material) prepared in Example 1 was dissolved in 20 parts of tetrahydrofuran to prepare a solution, and 0.10 part 1N-hydrochoric acid solution was added thereto and the solution was stirred for more than 1 hr at a room temperature to prepare an organic-inorganic hybrid surface layer coating liquid.

The electrophotographic photoreceptor was installed in a modified imagio MF2200 from Ricoh Company, Ltd., using a laser diode having a wavelength of 655 nm as an imagewise light source, and 150,000 images were produced thereby on A4-size My Paper from NBS RICOH Co., Ltd., wherein the electrophotographic photoreceptor had a charged potential of −700 V at start-up, to evaluate an abrasion resistance and a potential of the photoreceptor, and image quality, i.e., image density and stripe image. The evaluation results are shown in Tables 2, 3 and 4.

The image density and stripe image were based on the following evaluation standards.

Image density: ○ good; Δ slightly deteriorated; X deteriorated

Stripe image: ○ good; Δ locally occurred; X wholly occurred

Example 8

The procedures for preparation and evaluation of the electrophotographic photoreceptor in Example 7 were repeated to prepare and evaluate an electrophotographic photoreceptor except for using a Polymer No. 2 for hybrid material instead of the Polymer No. 1 for hybrid material. The evaluation results are shown in Tables 2, 3 and 4.

Example 9

The procedures for preparation and evaluation of the electrophotographic photoreceptor in Example 7 were repeated to prepare and evaluate an electrophotographic photoreceptor except for using a Polymer No. 3 for hybrid material instead of the Polymer No. 1 for hybrid material. The evaluation results are shown in Tables 2, 3 and 4.

Example 10

The procedures for preparation and evaluation of the electrophotographic photoreceptor in Example 7 were repeated to prepare and evaluate an electrophotographic photoreceptor except for using a Polymer No. 4 for hybrid material instead of the Polymer No. 1 for hybrid material. The evaluation results are shown in Tables 2, 3 and 4.

Example 11

The procedures for preparation and evaluation of the electrophotographic photoreceptor in Example 7 were repeated to prepare and evaluate an electrophotographic photoreceptor except for using a Polymer No. 5 for hybrid material instead of the Polymer No. 1 for hybrid material. The evaluation results are shown in Tables 2, 3 and 4.

Example 12

The procedures for preparation and evaluation of the electrophotographic photoreceptor in Example 7 were repeated to prepare and evaluate an electrophotographic photoreceptor except for using a Polymer No. 6 for hybrid material instead of the Polymer No. 1 for hybrid material. The evaluation results are shown in Tables 2, 3 and 4.

Comparative Example 1

The procedures for preparation and evaluation of the electrophotographic photoreceptor in Example 7 were repeated to prepare and evaluate an electrophotographic photoreceptor except for using a surface layer coating liquid, wherein 5 parts of charge transportable polymer having a number-average molecular weight of 80,000 synthesized in reference to a method disclosed in Japanese Patent No. 3368415 were dissolved in 100 parts of tetrahydrofuran, instead of the organic-inorganic hybrid surface layer coating liquid including the Polymer No. 1 for hybrid material. The evaluation results are shown in Tables 2, 3 and 4.

Comparative Example 2

The procedures for preparation and evaluation of the electrophotographic photoreceptor in Example 7 were repeated to prepare and evaluate an electrophotographic photoreceptor except for using a surface layer coating liquid, wherein 5 parts of charge transportable polymer having a number-average molecular weight of 90,000 synthesized in reference to a method disclosed in Japanese Patent No. 3368415 were dissolved in 100 parts of tetrahydrofuran, instead of the organic-inorganic hybrid surface layer coating liquid including the Polymer No. 1 for hybrid material. The evaluation results are shown in Tables 2, 3 and 4.

Comparative Example 3

The procedures for preparation and evaluation of the electrophotographic photoreceptor in Example 7 were repeated to prepare and evaluate an electrophotographic photoreceptor except for using a surface layer coating liquid including the following constituents, prepared in reference to a method disclosed in Japanese Laid-Open Patent Publication No.2000-105474, instead of the organic-inorganic hybrid surface layer coating liquid including the Polymer No. 1 for hybrid material.

| | |
|---|---|
| Polycarbonate | 6.6 g |
| (Z300 from Mitsubishi Gas Chemical Co., Ltd.) | |
| CTM having the following formula: | 4.2 g |

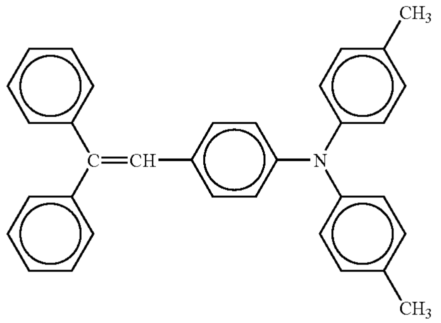

| | |
|---|---|
| Tetraethoxysilane | 0.33 g |
| Dichloromethane | 30 g |

The evaluation results are shown in Tables 2, 3 and 4.

TABLE 2

| | Abraded amount (μm) | | |
|---|---|---|---|
| | 50,000 | 100,000 | 150,000 |
| Example 7 | 0.42 | 1.10 | 2.32 |
| Example 8 | 0.45 | 1.01 | 2.01 |
| Example 9 | 0.42 | 0.71 | 1.68 |
| Example 10 | 0.30 | 0.62 | 1.22 |
| Example 11 | 0.29 | 0.60 | 1.19 |
| Example 12 | 0.27 | 0.59 | 1.16 |
| Comparative Example 1 | Surface layer disappeared | — | — |
| Comparative Example 2 | 2.90 | Surface layer disappeared | — |
| Comparative Example 3 | Irradiated part potential too large | — | — |

TABLE 3

| | Potential (−V) | | | | | | | |
|---|---|---|---|---|---|---|---|---|
| | Initial | | 50k | | 100k | | 150k | |
| | Dark | Bright | Dark | Bright | Dark | Bright | Dark | Bright |
| Ex. 7 | 700 | 100 | 705 | 105 | 700 | 105 | 695 | 120 |
| Ex. 8 | 700 | 90 | 700 | 110 | 695 | 120 | 690 | 130 |
| Ex. 9 | 700 | 95 | 700 | 100 | 695 | 105 | 700 | 105 |
| Ex. 10 | 700 | 90 | 705 | 95 | 700 | 100 | 710 | 110 |
| Ex. 11 | 700 | 85 | 700 | 90 | 695 | 90 | 695 | 95 |
| Ex. 12 | 700 | 90 | 700 | 95 | 705 | 100 | 700 | 95 |
| Com. Ex. 1 | 700 | 85 | — | — | — | — | — | — |
| Com. Ex. 2 | 700 | 100 | 700 | 120 | — | — | — | — |
| Com. Ex. 3 | 700 | 50 | — | — | — | — | — | — |

TABLE 4

| | Image density | | | | Stripe image | | | |
|---|---|---|---|---|---|---|---|---|
| | Initial | 50k | 100k | 150k | Initial | 50k | 100k | 150k |
| Ex. 7 | ○ | ○ | ○ | ○ | ○ | ○ | ○ | ○ |
| Ex. 8 | ○ | ○ | ○ | ○ | ○ | ○ | ○ | ○ |
| Ex. 9 | ○ | ○ | ○ | Δ | ○ | ○ | ○ | ○ |
| Ex. 10 | ○ | ○ | ○ | ○ | ○ | ○ | ○ | ○ |
| Ex. 11 | ○ | ○ | ○ | ○ | ○ | ○ | ○ | ○ |
| Ex. 12 | ○ | ○ | ○ | ○ | ○ | ○ | ○ | ○ |
| Com. Ex. 1 | ○ | X | — | — | ○ | X | — | — |
| Com. Ex. 2 | ○ | ○ | Unevaluable | — | ○ | ○ | Unevaluable | — |
| Com. Ex. 3 | ○ | Unevaluable | — | — | ○ | Unevaluable | — | — |

As Examples 7 to 12 show, the photoreceptors including the organic-inorganic hybrid material including a charge transportable constituent of the present invention had good abrasion resistance, inner potential and image properties, and stably produced images having high image density and quality.

In Comparative Example 1, the photoreceptor did not include an inorganic material and abraded so much that the surface layer disappeared before producing 50,000 images. In Comparative Example 2, the photoreceptor did not include an inorganic material, either and abraded so much that the surface layer disappeared before producing 100,000 images. In Comparative Example 3, the photoreceptor had a crosslinked surface layer simply including a low-molecular-weight charge transport material and a polycarbonate resin, and therefore abraded much as the photoreceptors in Comparative Examples 1 and 2 did. In addition, the image density lowered because the low-molecular-weight charge transport material separated out, and the irradiated part potential became too large to be evaluated before 50,000 images were produced.

This application claims priority and contains subject matter related to Japanese Patent Application No. 2004-326497 filed on Nov. 10, 2004, the entire contents of which are hereby incorporated by reference.

Having now fully described the invention, it will be apparent to one of ordinary skill in the art that many changes and modifications can be made thereto without departing from the spirit and scope of the invention as set forth therein.

What is claimed is:

1. An organic-inorganic hybrid material, comprising:

a charge transportable organic polymer; and a alkoxide group combined therewith;

wherein the organic-inorganic hybrid material has the following formula (8):

(8)

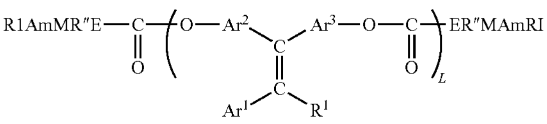

wherein $R^1$ represents a hydrogen atom, an alkyl group or an aryl group; $Ar^1$ represents an aryl group; $Ar^2$ and $Ar^3$ respectively represent an arylene group; R1represents an alkyl group having 1 to 12 carbon atoms; A represents an alkoxy group having 1 to 8 carbon atoms; M represents a metal element selected from the group consisting of Si, Ti, Zr, Fe, Cu, Sn, B, Al, Ge, Ce and Ta; R" represents an alkylene group or an alkylidene group having 1 to 4, preferably from 2 to 4, carbon atoms; and m represents an integer of from 1 to 3; E represents —NH— or —O—; and L represents a polymer including a repeat unit shown by the case arc.

2. The organic-inorganic hybrid material of claim 1, wherein the charge transportable organic polymer comprises a constituent having the following formula (2):

(2)

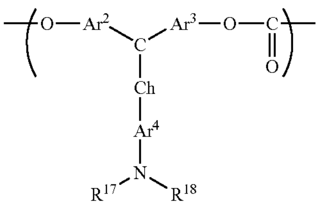

wherein $Ar^2$, $Ar^3$ and $Ar^4$ respectively represent an arylene group; and $R^{17}$ and $R^{18}$ independently represent an acyl group, an alkyl group or an aryl group.

3. The organic-inorganic hybrid material of claim 1, wherein the charge transportable organic polymer comprises a constituent having the following formula (3):

(3)

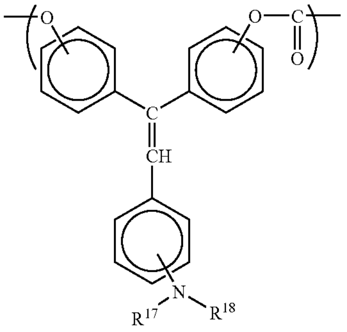

wherein $R^{17}$ and $R^{18}$ independently represent an acyl group, an alkyl group or an aryl group.

4. The organic-inorganic hybrid material of claim 1, wherein the charge transportable organic polymer comprises a constituent having the following formula (4):

(4)

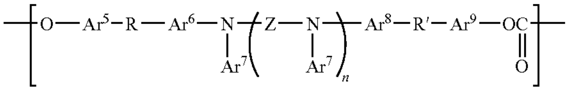

wherein $Ar^5$, $Ar^6$, $Ar^8$ and $Ar^9$ respectively represent an arylene group; $Ar^7$ represents an aryl group; Z represents an arylene group or $-Ar^{10}$-Za-$Ar^{10}$- wherein $Ar^{10}$ represents an arylene group; Za represents O, S or an alkylene group; R and R' respectively represent a straight-chain or a branched-chain alkylene group; and n represents 0 or 1.

5. The organic-inorganic hybrid material of claim 1, wherein the charge transportable organic polymer comprises a constituent having the following formula (5):

(5)

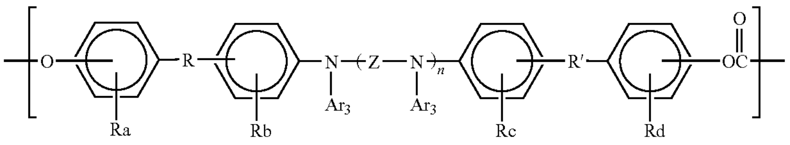

wherein Ra, Rb, Rc and Rd respectively represent an alkyl group; $Ar^3$ represents an aryl group; Z represents an arylene group or —$Ar^{10}$-Za-$Ar^{10}$— wherein $Ar^{10}$ represents an arylene group; Za represents O, S or an alkylene group; R and R' respectively represent a straight-chain or a branched-chain alkylene group; and n represents 0 or 1.

hydrolyzing and polycondensating a metal alkoxide group in the polymer for hybrid material.

11. A polymer for hybrid material, comprising:

a charge transportable organic polymer; and a metal alkoxide group combined therewith, wherein the polymer for hybrid material has the following formula (10):

(10)

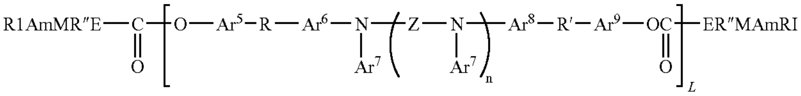

(11)

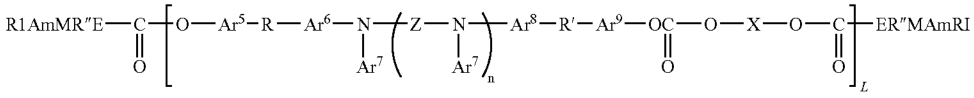

6. The organic-inorganic hybrid material of claim 1, wherein R1 represents an alkyl group having 1 to 5 carbon atoms; A represents an alkoxy group having 1 to 4 carbon atoms; M represents a metal element selected from the group consisting of Si, Ti, and Zr; R" represents an alkylene group or an alkylidene group having 2 to 4 carbon atoms; X' represents a functional group selected from the group consisting of isocyanate groups, epoxy groups, carboxyl groups, acid halide group and acid anhydride groups; 1 represents 0 or an integer of from 1 to 3; and m and n independently represent an integer of from 1 to 3.

7. The organic-inorganic hybrid material of claim 6, wherein M is silicon.

8. The organic-inorganic hybrid material of claim 1, wherein the charge transportable organic polymer has a number-average molecular weight of from 40 to 40,000.

9. A method of preparing the organic-inorganic hybrid material according to claim 1, comprising:

combining the charge transportable organic polymer comprising a constituent having the formula (1) with a metal alkoxide having the formula (A) to prepare a polymer for hybrid material; and hydrolyzing and polycondensating a metal alkoxide group in the polymer for hybrid material.

10. A method of preparing the organic-inorganic hybrid material of claim 4, comprising:

combining the charge transportable organic polymer comprising a constituent having the formula (4) with the metal alkoxide having the formula (A) to prepare a polymer for hybrid material; and wherein $Ar^5$, $Ar^6$, $Ar^8$ and $Ar^9$ respectively represent an arylene group; $A^7$ represents an aryl group; Z represents an arylene group or -$Ar^{10}$-Za-$Ar^{10}$- wherein $Ar^{10}$ represents an arylene group; Za represents O, S or an alkylene group; R and R' respectively represent a straight-chain or a branched-chain alkylene group; n represents 0 or 1; R1 represents an alkyl group having 1 to 12, preferably from 1 to 5, carbon atoms; A represents an alkoxy group having 1 to 8, preferably from 1 to 4, carbon atoms; M represents a metal element selected from the group consisting of Si, Ti, Zr, Fe, Cu, Sn, B, Al, Ge, Ce and Ta, preferably from the group consisting of Si, Ti and Zr; R" represents an alkylene group or an alkylidene group having 1 to 4, preferably from 2 to 4, carbon atoms; and m represents an integer of from 1 to 3; E represents —NH— or —O—; and L represents a polymer including a repeat unit shown by the case arc.

13. An electrophotographic photoreceptor comprising:

an electroconductive substrate; and a photosensitive layer located overlying the electroconductive substrate, wherein the photosensitive layer comprises the organic-inorganic hybrid material according to claim 1.

14. A method of preparing an electrophotographic photoreceptor, comprising:

forming a layer including the polymer for hybrid material according to claim 11 on an electroconductive substrate; and hydrolyzing and polycondensating the polymer for hybrid material.

15. A process cartridge detachable from an image forming apparatus, comprising:

the electrophotographic photoreceptor according to claim 13; and at least one of a charger, an image developer, a transferer, a cleaner and a discharger.

16. An image forming apparatus comprising:

the electrophotographic photoreceptor according to claim 13;

a charger configured to charge the electrophotographic photoreceptor;

an irradiator configured to irradiate the electrophotographic photoreceptor to form an electrostatic latent image thereon;

an image developer configured to develop the electrostatic latent image with a developer comprising a toner to form a toner image on the electrophotographic photoreceptor; and a transferer configured to transfer the toner image onto a transfer sheet.

17. An image forming method comprising:

charging the electrophotographic photoreceptor according to claim 13;

irradiating the electrophotographic photoreceptor to form an electrostatic latent image thereon;

developing the electrostatic latent image with a developer comprising a toner to form a toner image on the electrophotographic photoreceptor; and transferring the toner image onto a transfer sheet.

* * * * *